US 6,725,311 B1

(12) United States Patent
Joy et al.

(10) Patent No.: US 6,725,311 B1
(45) Date of Patent: Apr. 20, 2004

(54) METHOD AND APPARATUS FOR PROVIDING A CONNECTION-ORIENTED NETWORK OVER A SERIAL BUS

(75) Inventors: Joseph M Joy, Redmond, WA (US);
Arvind Murching, Issaquah, WA (US);
Aditya Dube, Redmond, WA (US);
Alireza Dabagh, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 09/662,155

(22) Filed: Sep. 14, 2000

(51) Int. Cl.$^7$ .................. G06F 15/163; H04L 12/40; H04Q 3/545
(52) U.S. Cl. ................. 710/305; 710/105; 370/409
(58) Field of Search .................... 710/100, 105, 710/305, 315, 63, 52; 709/200, 203, 250, 220, 253, 302; 370/466, 401, 467, 252, 257, 901, 908, 912, 399, 409, 420

(56) References Cited

U.S. PATENT DOCUMENTS

| 5,845,152 | A | | 12/1998 | Anderson et al. |
| 5,911,059 | A | | 6/1999 | Profit, Jr. |
| 5,938,735 | A | * | 8/1999 | Malik |
| 5,953,511 | A | | 9/1999 | Sescila, III et al. |
| 5,978,902 | A | | 11/1999 | Mann |
| 5,991,520 | A | * | 11/1999 | Smyers et al. |
| 6,088,364 | A | * | 7/2000 | Tokuhiro |
| 6,094,530 | A | | 7/2000 | Brandewie |
| 6,134,662 | A | * | 10/2000 | Levy et al. |
| 6,279,123 | B1 | | 8/2001 | Mulrooney |
| 6,347,337 | B1 | * | 2/2002 | Shah et al. |
| 6,353,898 | B1 | | 3/2002 | Wipfel et al. |
| 6,374,399 | B1 | | 4/2002 | Mann |
| 6,378,000 | B1 | * | 4/2002 | Akatsu et al. |
| 6,430,635 | B1 | | 8/2002 | Kwon et al. |
| 6,434,117 | B1 | | 8/2002 | Momona |
| 6,496,509 | B1 | * | 12/2002 | Fant |
| 6,522,654 | B1 | * | 2/2003 | Small |
| 6,538,758 | B1 | | 3/2003 | Ikegawa |
| 6,600,756 | B1 | | 7/2003 | Haviland |
| 2002/0133632 | A1 | | 9/2002 | Salazar |
| 2002/0141418 | A1 | | 10/2002 | Ben-Dor et al. |
| 2003/0078063 | A1 | | 4/2003 | Legallais et al. |

OTHER PUBLICATIONS

G. Hoffman et al., IEEE 1394: A Ubiquitous Bus, COMPCON '95, Mar. 5, 1995, pp. 1–9, www.skipstone.com/comcon.html.
IEEE std 1394–1995, IEEE Standard for a High Performance Serial Bus, 1996, pp. 1–45.
Search Report.
The Promoters of the 1394 Open HCI, "1394 Open Host Controller Interface Specification", Sep. 29, 1997, pp. 1–168.

(List continued on next page.)

*Primary Examiner*—Gopal C. Ray
(74) *Attorney, Agent, or Firm*—Banner & Witcoff, Ltd.

(57) ABSTRACT

A method and apparatus provides a method and apparatus for treating a serial bus, such as an IEEE 1394 bus, as a connection-oriented network. In one embodiment, an application programming interface (API) permits different protocols (e.g., TCP/IP, IPX, and others) to connect to the 1394 bus and to make use of various 1394 features, such as isochronous packet transmission, without knowledge of hardware-specific idiosyncrasies. A call is made to set up a connection (a "virtual circuit") over the serial bus, and, thereafter, a connection "handle" is used to communicate over the bus using the connection. Different types of connections can be provided, including a node-specific connection; a channel-specific connection; and a receiving connection (e.g., for incoming data). In one embodiment, a programming interface hides details of the connection setup, and includes packet fragmentation and reassembly functions. Because multiple protocols can share common communication facilities, code re-use is maximized.

22 Claims, 7 Drawing Sheets

OTHER PUBLICATIONS

D. Plummer, "RFC 826: An Ethernet Address Resolution Protocol", http://cie.motor.ru/RFC/Orig/rfc826.txt, Nov. 1982, pp. 1–8.

J. Postel, et al., "RFC 1042: A Standard for the Transmission of IP Datagrams over IEE 802 Networks", http://IEC,motor.ru/RFC/Orig/rfc1042.txt, Feb. 1988, pp. 1–14.

International Electrotechnical Commission, "Consumer audio/video equipment– Digital interface– Part 1: General", IEC First edition, Feb. 1998, Reference No. 61883–1, pp. 7–78.

International Electrotechnical Commission, "Consumer audio/video equipment– Digital Interface– Part 2: SD–DVCR data transmission", IEC First edition, Feb. 1998, Reference No. 61883–2, pp. 5–15.

International Electrotechnical Commission, "Consumer audio/video equipment– Digital interface– Part 3: HD–DVCR data transmission", IEC First edition, Feb. 1998, Reference No. 61883–3, pp. 5–13.

International Electrotechnical Commission, "Consumer audio/video equipment– Digital interface– Part 4: MPEG2–TS data transmission", IEC First edition, Feb. 1998, Reference No. 61883–4, pp. 5–23.

International Electrotechnical Commission, "Consumer audio/video equipment– Digital interface– Part 5: SDL–DVCR data transmission", IEC First edition, Feb. 1998, Reference No. 61883–5, pp. 5–17.

International Electrotechnical Commission, "Consumer Audio/Video Equipment– Digital Interface– Part 6: Audio and music data transmission protocol", IEC Reference No. 61883–6/WD2, Nov. 1999, pp. 1–23.

MindShare, Inc., D. Anderson, "Fire Wire System Architecture IEEE 1394a Second Edition PC System Architecture Series", Dec. 1998, pp. 13–34.

"P1394.1 Draft Standard for High Performance Serial Bus Bridges", The Institute of Electrical and Electronics Engineers, Inc., Feb. 7, 1999, pp. 9–34.

Microsoft Corporation, "SBP–2 Support and Windows 2000", http://agent.microsoft.com/hwdev/print/sbp2_w2000.htm, Mar. 25, 1999.

Microsoft Corporation, "Windows 2000 Driver Development Kit Documentation", www.microsoft.com/hwdev/ddk/DDKdocs/Win2k/202mini_60yv.htm, Apr. 1999.

Microsoft Corporation, "Windows 2000 Driver Development Kit Documentation", http://www.microsoft.com/hwdev/ddk/DDKdocs/Win2k/102gen_9eg7.htm, et al., Apr. 1999.

Microsoft Corporation, "Windows 2000 Driver Development Kit Documentation", www.microsoft.com/hwdev/ddk/DDKdocs/Win2K/102gen_9ffr.htm, et al., Apr. 1999.

Microsoft Corporation, "NdisSendPackets", http://www.Microsoft.com/ddk/DDKdocs/Win2K/103ndisx_88s2.htm, Apr. 1999.

Microsoft Corporation, "NdisClCloseCall", http://www.microsoft.com/hwdev/ddk/DDKdocs/Win2K103ndisx_7rsi.htm, Apr. 1999.

Microsoft Corporation, "Windows 2000 Driver Development Kit Documentation", http://www.microsoft.com/ddk/ddkdocs/win2K/vdd_24px.htm, et al., Apr. 1999.

Cisco Systems Inc., "Quality of Service (QoS) Networking", http://www.cisco.com/univercd/cc/td/doc/cisintwk/ito_doc/qos.htm, Jun. 1999.

Microsoft Corporation, "Quality of Service Technical White Paper", 1999.

IETF, T. Saito, et al., "'IP over iso1394' and 'AV over iso1394' controlled by an extension of MCAP", http://search.ietf.org/internet–drafts/draft–ietf–ip1394–ip–over–iso1394–00.txt, pp. 1–11, Sep. 1999.

Microsoft Corporation, "A Short Overview of QoS Mechanisms and Their Interoperation", 1999, pp. 1–7.

Congruent Software, Inc., P. Johansson, "RFC 2734: Ipv4 over IEEE 1394", Dec. 1999.

D. Steinberg, et al., "An Empirical Analysis of the IEEE–1394 Serial bus Protocol", IEEE Jan. 2000, pp. 58–64.

Unibrain S.A., "Unibrain FireAPI™ Documentation, 1394 Class Driver, User Mode Interface", Apr. 4, 2000, pp. 1–281.

Unibrain S.A., "The IEEE–1394 Development Toolkit for Windows NT 4.0/98/98SE", http://www.unibrain.com/products/ieee–1394/fireapi.htm, Apr. 14, 2000.

Arun Ayyagari et al., "IEEE 802.11 Quality of Service", white paper, Mar. 2000, 10 pages.

\* cited by examiner

METHOD AND APPARATUS FOR PROVIDING A CONNECTION-ORIENTED NETWORK OVER A SERIAL BUS

TECHNICAL FIELD

This invention relates generally to the use of a serial bus as a means of packet communication in a computer system. More particularly, the invention provides a method and apparatus for using a serial bus, such as an IEEE 1394 bus, to transmit data packets using a connection-oriented interface.

BACKGROUND OF THE INVENTION

The use of serial buses in computer systems is well known. A recently developed serial bus, referred to as the IEEE 1394 bus, is based on the internationally adopted ISO/IEC 13213 (ANSI/IEE 1212) CSR Architecture Specification and the IEEE 1394-1995 Serial Bus Specification, both of which are publicly available documents. A typical system conforming to the IEEE 1394 standard includes a plurality of nodes that are interconnected via point-to-point links, such as cables, that each connect a single node of the serial bus to another node of the serial bus. The nodes are addressable entities that can be independently reset and identified. The 1394 bus provides both asynchronous and isochronous (time-guaranteed delivery) capabilities.

Various implementations of the IEEE 1394 bus in computer systems typically include layered hardware and software protocols. The Internet Engineering Task Force (IETF) Request for Comments (RFC) $2734_{[D1]}$ describes a scheme for using the 1394 bus to transmit Internet Protocol datagrams according to IPv4. The RFC is specific to the IPv4 protocol (described in IETF RFC 791) and does not contemplate use of the isochronous facilities of the 1394 bus. There is also no provision for streaming raw data to 1394 devices at the application level, a capability that would be useful in 1394-based systems. Moreover, there is no provision for providing connection-oriented communication between nodes on the serial bus.

When the evolving IPv6 protocol (described in IETF RFC 2460) standard is completed and implemented, interfaces between the upper level protocols and the 1394 bus will need to be reworked to adapt to that standard. Legacy applications would need to be upgraded to the IPv6 standard, thus incurring expense to change and debug software. It would be advantageous if a system could implement the IPv6 protocol in a manner that co-exists with the IPv4 protocol, so that legacy applications could continue to use the older IPv4 while newer applications could make use of IPv6. Moreover, it would be advantageous if different applications within a bus node could communicate over the 1394 bus using both connectionless and connection-oriented facilities.

SUMMARY OF THE INVENTION

The invention provides a method and apparatus for treating a serial bus, such as the IEEE 1394 bus, as a connection-oriented network. In one embodiment, an application programming interface (API) permits different protocols and applications to connect to the 1394 bus and to make use of various 1394 features, such as isochronous packet transmission, without knowledge of hardware-specific idiosyncrasies. More generally, the invention allows network clients that conventionally use network-oriented protocols to communicate over a non-networked medium, such as a serial bus.

According to one aspect of the invention, a call is made to set up a connection (a "virtual circuit") over the serial bus, and, thereafter, a connection "handle" is used to communicate over the bus using the connection. Different types of connections can be provided, including a node-specific connection; a channel-specific connection; and a receiving connection (e.g., for incoming data). In one embodiment, a programming interface hides details of the connection set-up, and includes packet fragmentation and reassembly functions. Because multiple protocols can share common communication facilities, code re-use is maximized.

According to another aspect of the invention, an application programming interface (API) is provided that permits certain applications to communicate over the serial bus in a connectionless packet-oriented manner, while other applications can simultaneously communicate over the same bus using a connection-oriented networking model. Other details and advantages will become apparent through the following detailed description, the figures, and the claims.

DETAILED DESCRIPTION OF THE INVENTION

Figure 1:
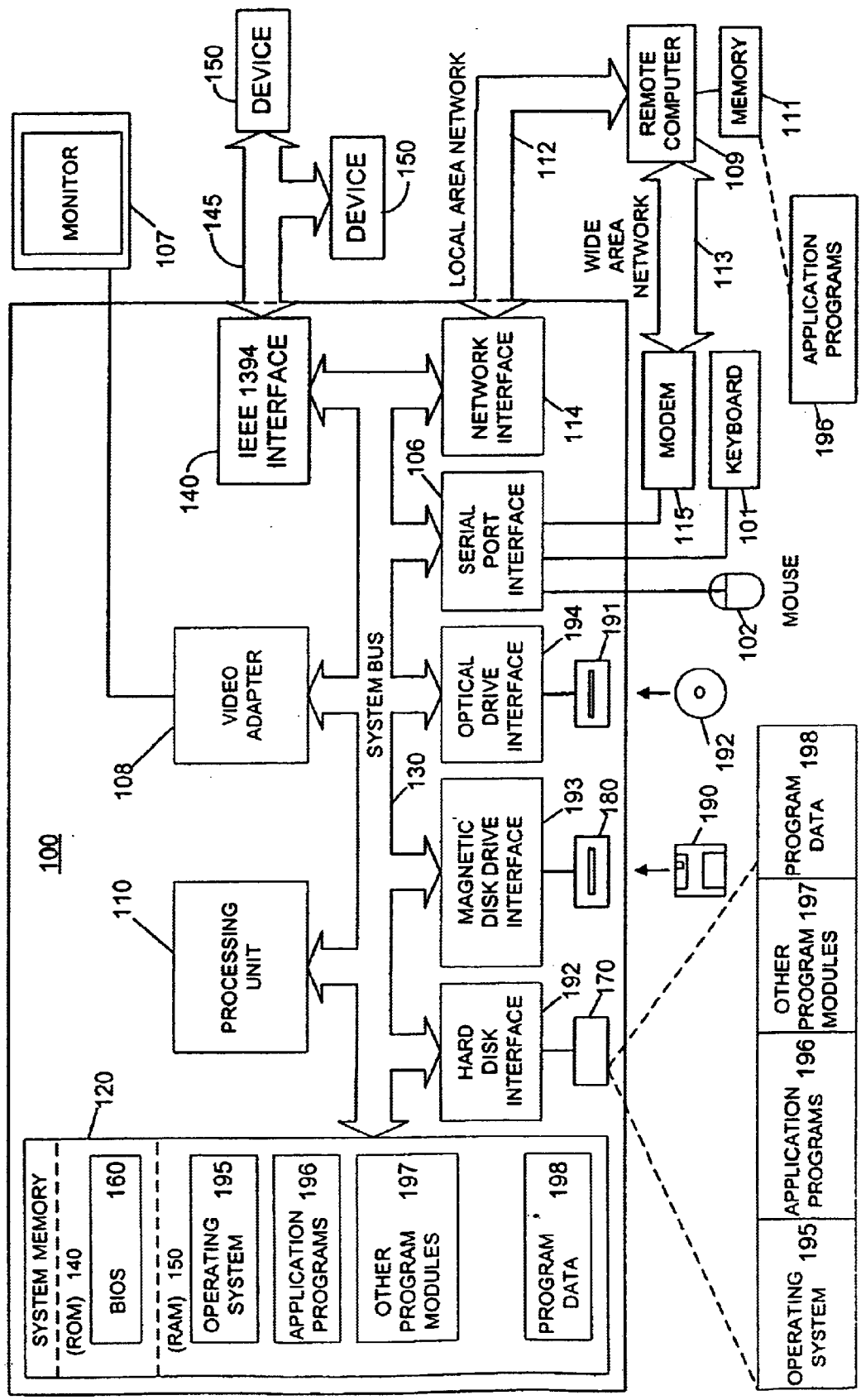
FIG. 1 is a schematic block diagram of a conventional general-purpose digital computing environment that can be used to implement various aspects of the present invention.

FIG. 1 is a schematic diagram of a conventional general-purpose digital-computing environment that can be used to implement various aspects of the present invention. A computer 100 includes a processing unit 110, a system memory 120 and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for the computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. In particular, the RAM 150 will, from time to time, store various device drivers, as known in the art. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers. typically include other peripheral output devices (not shown), such as speakers and printers.

An IEEE 1394 interface 140 may also be provided. The IEEE 1394 interface 140 couples an IEEE 1394-compliant serial bus 145 to the system bus 130 or similar communication bus. The IEEE 1394-compliant serial bus 145, as known in the art, allows multiple devices 150 to communicate with the computer 100 and each other using high-speed serial channels. The IEEE 1394 serial bus standard is based largely upon the internationally adopted ISO/IEC 13213 (ANSI/IEEE 1212) CSR Architecture Specification and the IEEE 1394-1995 Serial Bus Specification, the teachings of which are herein incorporated by reference. Additional buses such as the PCI bus can be provided in computer 100 and interfaced to the IEEE 1394 and other buses.

A typical serial bus having an IEEE 1394 standard architecture is comprised of a multiplicity of nodes that are interconnected via point-to-point links, such as cables, that each connect a single node of the serial bus to another node of the serial bus. The nodes themselves are addressable entities that can be independently reset and identified. Nodes are logical entities, each with a unique address. Each node provides a so-called configuration ROM (read-only memory)—hereinafter referred to as configuration memory—and a standardized set of control registers that can be accessed by software residing within the computer system.

The computer 100 can operate in a networked environment using logical connections to one or more remote computers, such as a remote computer 109. The remote computer 109 typically includes at least some of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to local network 112 through a network interface or adapter 114. When used in a WAN networking environment, the computer 100 and remote computer 109 may both include a modem 115 or other means for establishing a communications over wide area network 113, such as the Internet. The modem 115, which may be internal or external, is connected to system bus 130 via the serial port interface 106. In a networked environment, program modules depicted relative to the computer 100, or portions thereof, may be stored in the remote memory storage device.

It will be appreciated that the network connections shown are exemplary and other means of establishing a communications link between the computers can be used. The existence of any of various well-known protocols, such as TCP/IP, ETHERNET, FTP, HTTP and the like, is presumed, and the system can be operated in a client-server configuration to permit a user to retrieve web pages from a web-based server. Procedures of the present invention to be described below can operate within the environment of the computer 100 shown in FIG. 1. Although the invention is generally applicable to a computer operating in accordance with the IEEE 1394 standard, it is not intended to be so limited.

Figure 2:
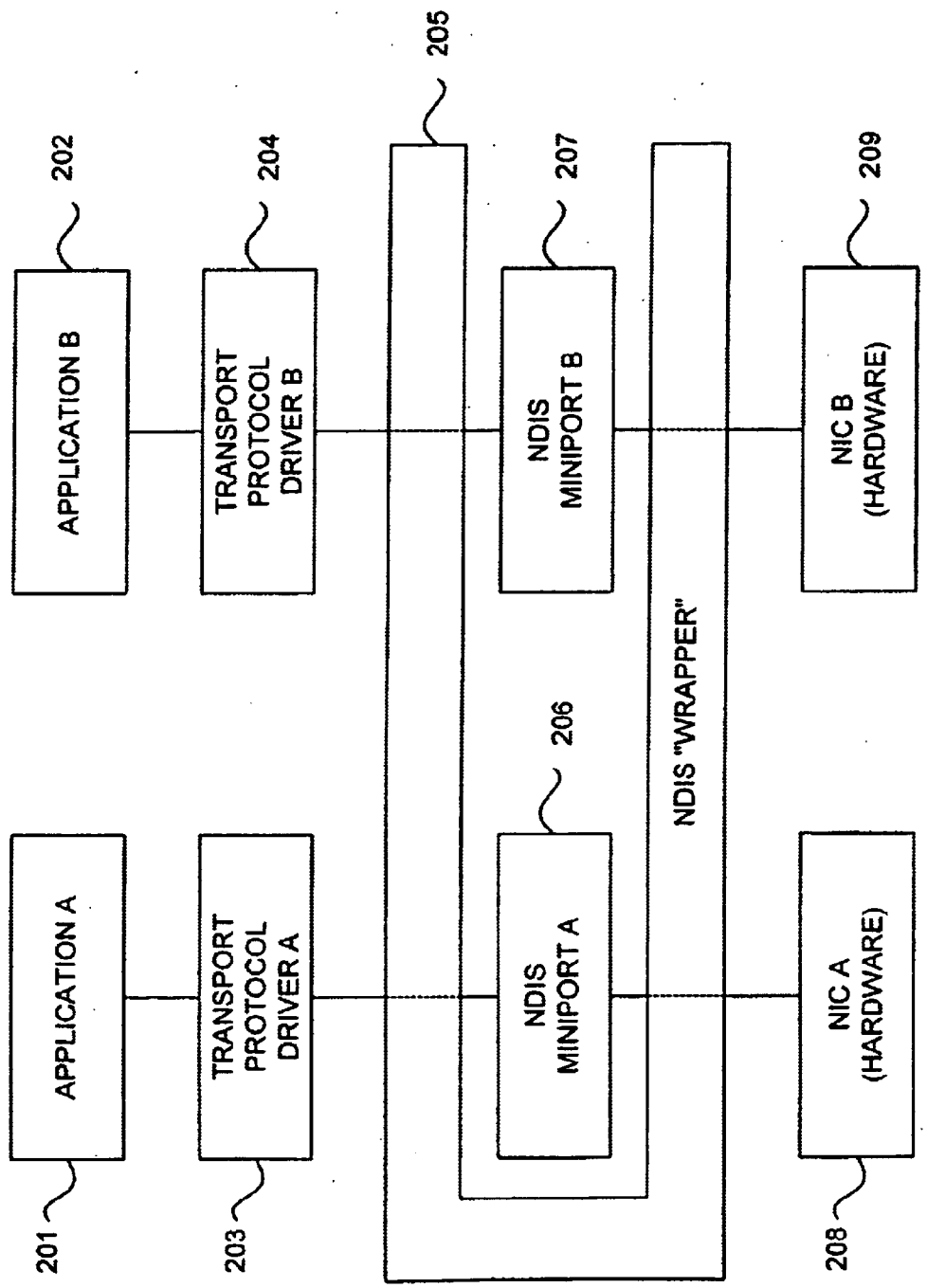
FIG. 2 shows a conventional approach for layering software driver functions using miniports.

FIG. 2 shows a conventional architecture in which a layered software approach is used to isolate network hardware devices (e.g., Ethernet cards) from application programs. As shown in FIG. 2, application programs 201 and 202 communicate through transport protocol drivers 203 and 204 respectively. Transport protocol drivers 203 and 204 implement a network protocol stack such as the well-known TCP/IP or IPX protocols, and can offer services over one or more network devices.

Each transport driver communicates with one or more miniports 206 and 207 through software functions that are defined by a Network Device Interface Specification (NDIS) 205. NDIS 205 generally provides transparency by allowing protocols to be bound to the hardware without having knowledge of specific hardware functions. The NDIS interface provides application programming interfaces (APIs) that allow access to functions that are common to many network devices.

Each miniport 206 and 207 is a lowest-layer driver that provides support for a specific network interface card (NIC), such as an Ethernet card. Each miniport manages a NIC, including sending and receiving data through the NIC, and interfacing with higher-level drivers, such as transport protocol drivers 203 and 204. Instead of making direct calls to operating system functions, each miniport uses NDIS functions to perform such functions. The use of miniports allows drivers (miniports) to be written with only code that is specific to the specific network hardware, making them much smaller and faster. Hardware functions that are common across different network interface devices are instead provided as part of NDIS and thus shared by different miniports.

The network software components shown in FIG. 2 can be bound together in a logical hierarchy. For example, each transport driver can be bound to one or more network cards through an associated miniport. The conventional miniports shown in FIG. 2 are "connectionless" in that they do not maintain state for packets that are transmitted or received over a network. Examples of such networks include Ethernet, FDDI, and Token Ring, among others.

Figure 2A:
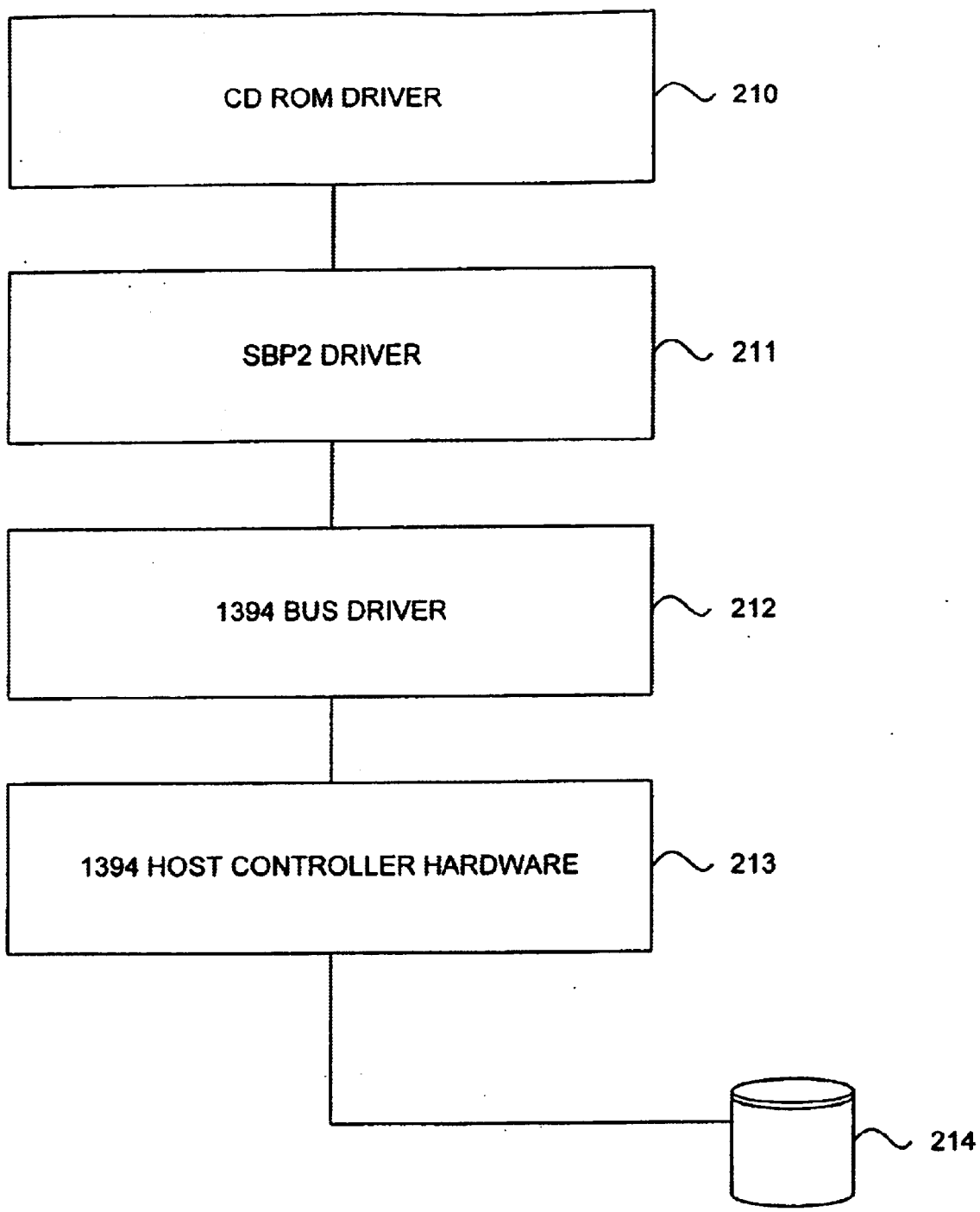
FIG. 2A shows a conventional approach for interfacing an external device to a computer using IEEE 1394 hardware and software.

FIG. 2A shows a conventional approach for interfacing an external device, such as a 1394-based external CD-ROM drive, to a computer. The device 214 is coupled to a 1394 host controller card 213 in the computer, which is in turn driven by a 1394 bus driver 212. The 1394 bus driver interfaces to an SBP2 driver 211, which in turn is coupled to a CD-ROM driver 210.

According to one aspect of the present invention, connection-oriented facilities are provided that permit a serial bus, such as an IEEE 1394 serial bus, to be treated as a network. Connection-oriented miniports, by themselves, are not new. Connection-oriented NDIS facilities are publicly available and described in the Windows 2000 DDK, available from Microsoft Corporation of Redmond, Wash. They are used in ATM networks, and in Windows 2000 VPN (virtual private networking) solutions. However, serial buses have been traditionally used merely for communication between a computer and its peripheral devices. According to one aspect of the invention, existing and future connection-oriented applications can use the serial bus to transmit a large variety and quantity of data. Mapping connection-oriented interface semantics to a 1394 serial bus has heretofore not been accomplished.

Figure 3:
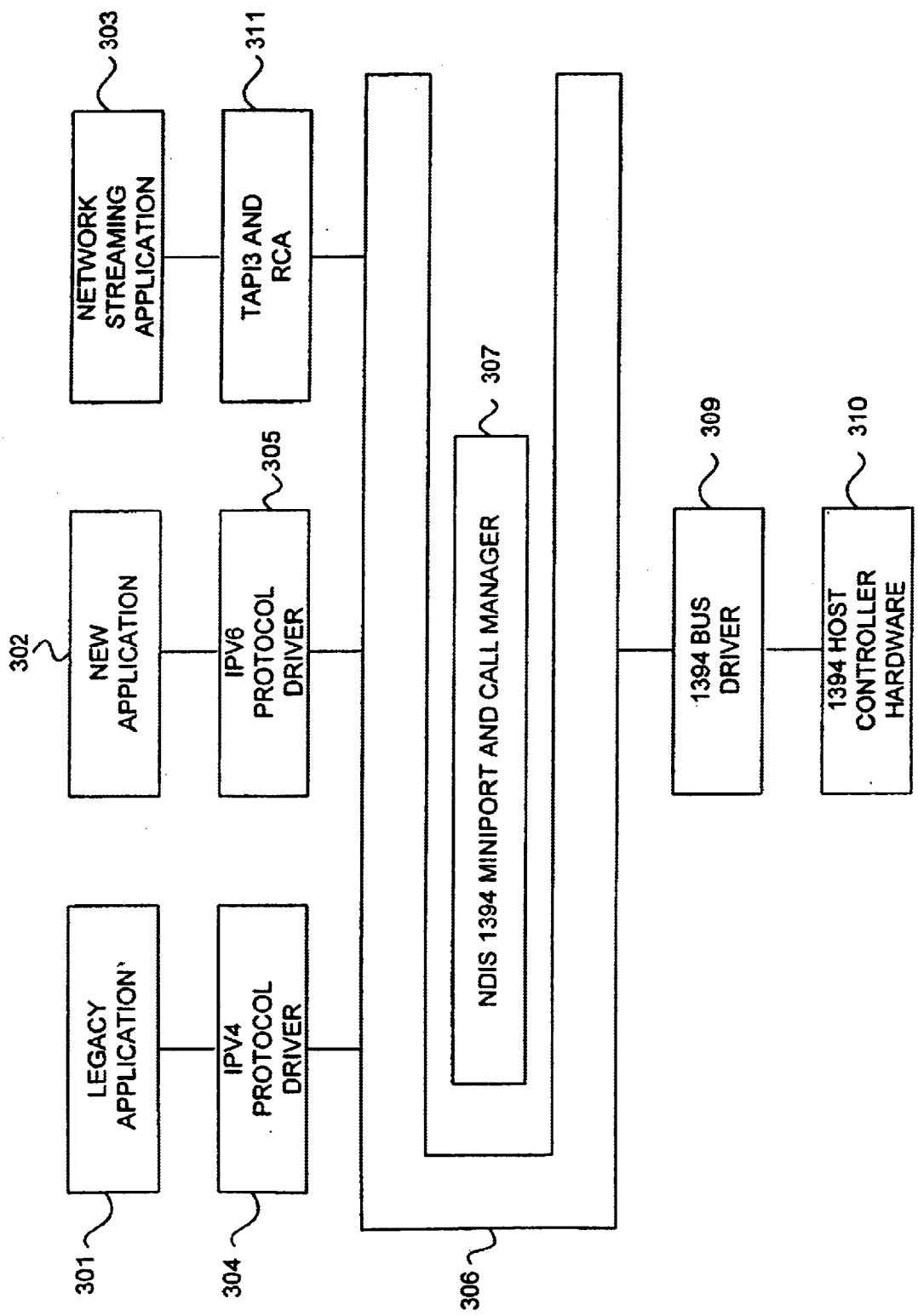
FIG. 3 shows a system constructed in accordance with one aspect of the present invention.

FIG. 3 shows a layered software architecture according to one aspect of the present invention, wherein certain NDIS miniport and call manager functions have been modified with new parameters to provide a connection-oriented interface to the IEEE 1394 serial bus. According to one variation of the invention, NDIS functions are internally modified to add "1394" as a new media type to those media that NDIS already supports (including Ethernet, FDDI, and ATM). These new parameters enable connection-oriented communication over the 1394 bus, as described in detail herein.

As shown in FIG. 3, legacy application 301 communicates using, for example, IPv4 protocol driver 304. New application 302 communicates using, for example, IPv6 protocol driver 305. Network streaming video application 303 communicates using TAPI3/RCA (Raw Channel Access) interface 311. Each of the above protocols communicates through the existing NDIS interface 306, using new 1394-specific parameters which provides connection-oriented and isochronous channel services as described in more detail below.

Connection-oriented NDIS ("CO-NDIS") 1394 miniport and call manager 307, hereinafter referred to as an NDIS 1394 miniport and by the abbreviation NIC1394, performs connection-oriented miniport-like functions and provides access to the 1394 serial bus through conventional 1394 Open Host Controller Interface software 309. The OHCI is described in the 1394 Open Host Controller Interface Specification, which is a publicly available document. This interface can transmit and receive all defined 1394 packet formats using Direct Memory Access (DMA) to write the packets into the host computer's memory. As shown in FIG. 3, two different networking protocols 304 and 305 are bound to the same miniport, and can both concurrently use the 1394 bus for networking functions.

The new configuration applies the existing connection oriented model to the serial bus. The NDIS miniport 307 is used to perform networking over the 1394 serial bus, which differs from the configuration shown in FIG. 2. In the conventional system of FIG. 2, the NDIS miniport directly controls some sort of hardware. According to one variation of the present invention, miniport 307 only interfaces with the 1394 modules 309 and 310.

Each 1394 host controller on a node is associated with a connection-oriented NDIS miniport 307. Protocols such as IPv4 304, IPv6 305, and RCA (Raw Channel Access) 311 bind to and open the NDIS miniport 307 in order to send and receive data between other 1394 nodes connected to this host controller. Different protocols can establish different types of connections depending on application needs (e.g., connectionless or connection-oriented, including isochronous channel-specific allocations as needed).

NDIS conventionally supports certain connection-oriented drivers, including a connection-oriented client; a call manager; an integrated miniport call manager (MCM), and a connection-oriented miniport. A connection-oriented miniport controls one or more network interface cards (NICs) and provides an interface between connection-oriented protocols (connection-oriented clients and call managers) and the NIC hardware. This conventional functionality, without serial-bus capabilities, is briefly described below for purposes of clarity.

A call manager is an NDIS protocol driver that provides call setup and tear-down services for connection-oriented clients. A call manager uses the send and receive capabilities of a connection-oriented miniport to exchange signaling messages with network entities, such as network switches or remote peers. A call manager supports one or more signaling protocols, such as ATM UNI 3.1 as specified by the ATM Forum.

An integrated miniport call manager (MCM) is a connection-oriented miniport that also provides call manager services to connection-oriented clients. Although an MCM provides the same connection-oriented services to clients as does a call manager paired with a connection-oriented miniport, its call manager/miniport interface is internal to the driver and therefore opaque to NDIS. More than one call manager and/or MCM can coexist in the same environment, and each call manager or MCM can support more than one signaling protocol.

A connection-oriented client uses the call-setup and tear-down services of a call manager or MCM. A connection-oriented client also uses the send and receive capabilities of a connection-oriented miniport or an MCM to send and receive data.

A connection-oriented client can be similar to a connectionless protocol in that it can, at its upper edge, provide its own network and transport-layer services to a higher-layer application. However, unlike a connectionless protocol, a connection-oriented client, at its lower edge, uses the services of a call manager and a connection-oriented miniport or it uses the services of an MCM. Alternatively, a connection-oriented client can be an adaptation layer, residing between a legacy protocol and connection-oriented NDIS. Examples of such an adaptation layer are IP/ATM and LAN Emulation (LANE), both of which use call management services to establish underlying connections but which hide the connection-oriented nature of this interface from the connectionless protocols above it. If a client is serving as an adaptation layer, its upper-edge interface is defined by the protocol that it is adapting to connection-oriented NDIS.

Figure 4:
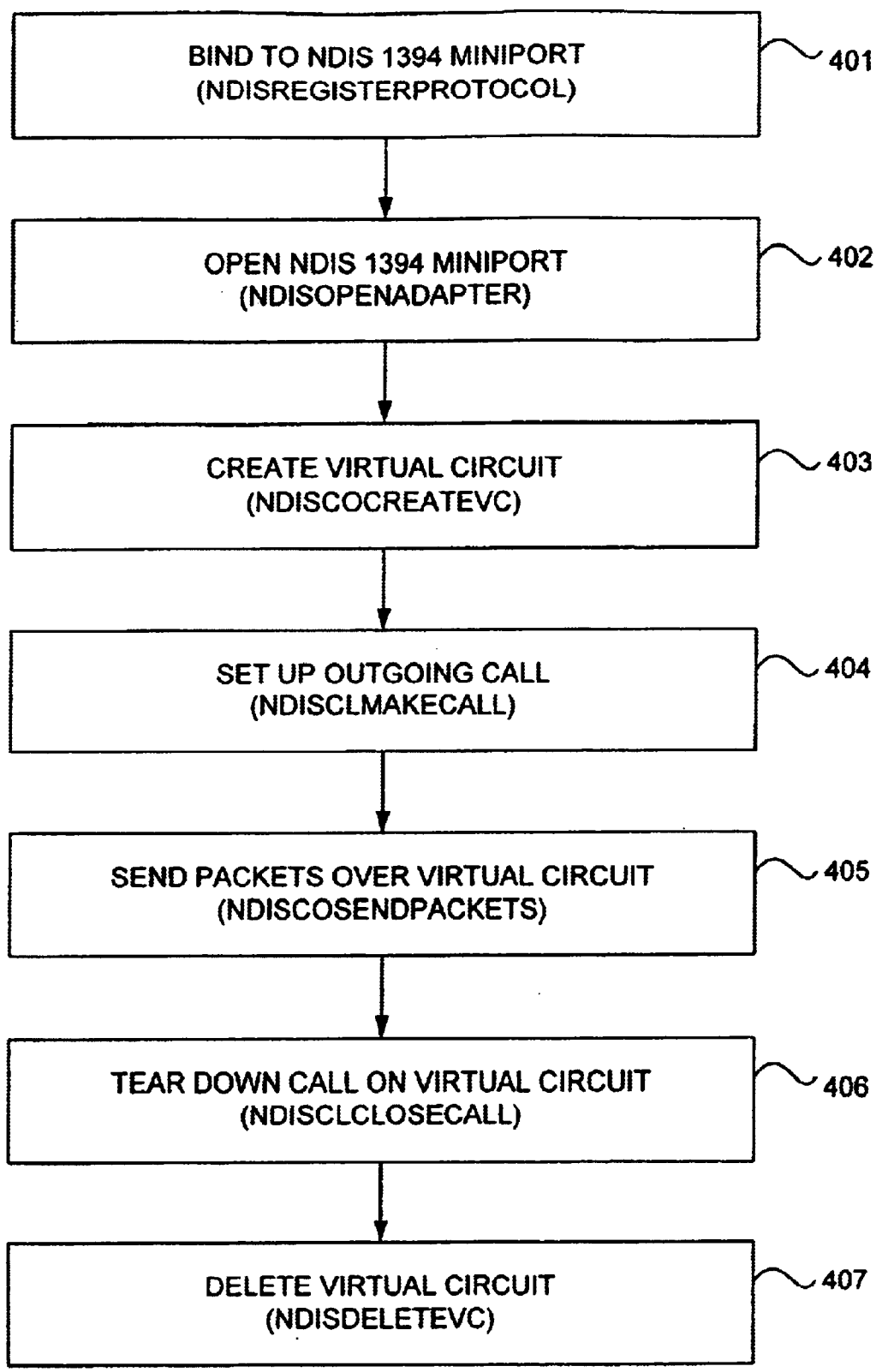
FIG. 4 shows method steps that can be executed to carry out various aspects of the present invention.

FIG. 4 shows steps that can be used by a client program or a protocol driver to use the 1394 serial bus in a connection-oriented manner to transmit data packets to another node on the bus. For example, a client program that is written for use in an ATM network can be modified to operate over a non-network medium such as the 1394 serial bus with few or no modifications. Functions referenced below are described in more detail herein.

In step 401, the client or protocol (e.g., protocol 304, 305, or 311) binds to the NDIS 1394 miniport. This step can be performed by calling NdisRegisterProtocol, which will call the protocol's bind handler when an NDIS 1394 miniport is created (or shortly after the protocol calls NdisRegisterProtocol, if the miniport already exists).

In step 402, the NDIS 1394 miniport is opened. This can be done by making a call to NdisOpenAdapter, specifying a new medium type, NDISMedium 1394. This is an existing function and no change has been made to it except that it recognizes NDISMedium 1394 as a valid argument.

NDIS will then call the protocol's CoAfRegisterNotify handler. This is part of existing NDIS semantics to notify protocols about the arrival of a connection-oriented miniport/call manager.

Upon receiving a notification, the binding between the protocol and the NDIS 1394 miniport is complete, and the protocol will have access to the 1394 host controller associated with the miniport, as described below.

In step 403, the protocol sets up a virtual circuit for communicating over the 1394 bus. The circuit can be associated with a particular channel on the 1394 bus, or with a particular address offset on a particular node.

The general sequence of NDIS calls to set up, use, and tear down a virtual circuit is as follows:
(1) NdisCoCreateVC: Creates a connection-oriented virtual circuit. According to the invention, this virtual circuit can be implemented over the 1394 bus.
(2) NdisCIMakeCall: Makes a "call" over a virtual circuit.
(3) NdisCoSendPackets: Called repeatedly to send packets over the 1394 bus using the virtual circuit. NDIS will call the protocol's receive packet handler to handle incoming packets.
(4) NdisCICloseCall: Terminates the "call" on a virtual circuit.
(5) NdisCoDeleteVC: Deletes the virtual circuit.

In general terms, each protocol (or application) creates one or more virtual circuits on the 1394 bus and receives a "handle" that identifies the virtual circuit. Each virtual circuit is associated with a specific remote 1394 node or a specific 1394 channel. Thereafter, packets are sent and received using these handles. When the virtual channel is no longer needed, it is destroyed and any bus resources released for allocation by other clients. Detailed information concerning the operation and interface for each of the above NDIS calls is provided herein under the heading "DETAILED NDIS FUNCTIONS."

Continuing with step 403 in FIG. 4, a virtual circuit is created by calling NdisCoCreateVC. Next, in step 404, a call is set up over the virtual circuit using NdisCIMakeCall.

In step 405, data packets are sent over the virtual circuit using NdisCoSendPackets. A client's Receive function is called whenever data is received by the 1394 card for this circuit.

In step 406, the virtual circuit is torn down using NdisCICloseCall. Finally, in step 407, the virtual circuit is deleted by calling NdisDeleteVC.

According to one variation of the invention, no new arguments are added to any of the pre-existing functions above to carry out the inventive principles. In the case where merely new values were defined (as in the case of the CoAfRegisterNotify Handler), the new values and their usages have been explained below.

Several different communication modes using the 1394 bus are possible, including: (A) communication using the 1394 broadcast channel; (B) communication using a specific channel (other than the broadcast channel); (C) receiving from multiple channels; (D) using isochronous facilities (e.g., allocation of bandwidth on the bus); and (E) point-to-point communication using asynchronous communication. Each of these is discussed in more detail below.

The different types of channels can be selected by setting appropriate fields in the media-specific parameters to NdisCIMakeCall. More specifically, the MediaParameters→MediaSpecific→Parameters subfield of the 2nd argument to NdisCIMakeCall is set to the 1394-specific structure, NIC1394_MEDIA_PARAMETERS. The fields in NIC1394_MEDIA_PARAMETERS specify details of the specific virtual circuit type being set up. The following subsections explain how this can be done for each type of virtual circuit.

A. Communicating over the 1394 Broadcast Channel

The 1394 broadcast channel is a special channel, typically channel 31, reserved for broadcast-based protocol use. It may be used by any 1394 device and is not restricted to a specific protocol. Every packet sent on the broadcast channel uses a special header, the GASP header, which is used to identify the destination endpoint. More details on the 1394 broadcast channel and the GASP header are available in RFC 2734.

A protocol sets up access to the broadcast channel by specifying the following NIC1394_MEDIA_PARAMETER field values:

| | |
|---|---|
| Destination.AddressType | == NIC1394_AddressType_Channel |
| Destination.Channel | == NIC1394_BROADCAST_CHANNEL |
| Flags | == NIC1394_VCFLAG_FRAMED |
| MaxSendBlockSize | == -1 |
| MaxSendSpeed | == -1 |
| MTU | == (refer to entry on NIC1394_MEDIA_PARAMETERS in the Reference section) |
| Bandwidth | == 0 |
| RecvFrameTypes | == Either 0 or one or more NIC1394_FRAMETYPE_* | values (refer to Reference section below).

The protocol sets the TRANSMIT_VC and RECEIVE_VC bits in CO_MEDIA_PARAMETERS.Flags if it intends to send and receive, respectively, packets on the virtual circuit. Both TRANSMIT_VC and RECEIVE_VC may be specified together.

Multiple protocols may concurrently access the broadcast channel. Received packets are indicated to all protocols that have set up a broadcast virtual circuit with the RECEIVE_VC flag set, subject to the filtering indicated in the RecvFrameTypes field.

EXAMPLE

Protocol 1 sets up a send and receive broadcast virtual circuit, specifying '0' in its RecvFrameTypes field. Protocol 2 also sets up a send and receive broadcast virtual circuit, but its RecvFrameTypes field is set to (NIC1394_FRAMETYPE_ARP | NIC1394_FRAMETYPE_IPV4). Packets of type "ARP" and "IPV4" are indicated to both Protocol 1 and Protocol 2. All other packets are indicated to Protocol 1 and may not be (at the discretion of the miniport implementation) indicated to Protocol 2.

The following explains in more detail how the above functions can be mapped to 1394-specific functions.

NdisCIMakeCall Implementation: When a protocol makes this call, NDIS calls the NDIS 1394 Miniport/Call manager's (NIC1394) MakeCall Handler. In the case of communication over a Channel, the NIC1394 sends I/O Request Packets (IRPs) to the 1394 drivers in this fashion:

1) It allocates a channel on the bus—if required by the flag NIC1394_VCFLAG_ALLOCATE.
2) It allocates resources on the Bus
3) It allocates IsochDescriptors to be used by the bus.
4) It then tells the bus to start listening on that channel All of the above can be done by using standard 1394 API's. No modifications are required to 1394 drivers to support these primitives.

NdisClCloseCall: When a protocol makes this call, NDIS calls the NIC1394's CloseCall Handler. In the case of communication over a channel, the NIC1394 sends IRPs to the 1394 drivers in this fashion:

1) It tells the bus driver to stop listening on that channel
2) It frees all IsochDescriptors that were allocated by the bus.
3) It releases all the resources that it had acquired from the bus
4) It releases the channel if it had allocated one All of the above can be done by using standard 1394 API's. No modifications are needed to the 1394 drivers to support these primitives.

NdisCoCreateVc: No 1394 operations are done here. NIC1394 allocates an internal data structure to keep track of the state of the VC.

NdisCoDeleteVc: No 1394 operations are done here. NIC1394 frees all internal data structures associated with this VC.

B. Communicating over a Specific Channel

A protocol can set up a virtual circuit to send or receive packets on a specific channel (a channel other than the broadcast channel). The following NIC1394_MEDIA_PARAMETER field values can be specified:

| | |
|---|---|
| Destination.AddressType | == NIC1394AddressType_Channel |
| Destination.Channel | == Channel number to be used (or NIC1394_ANY_CHANNEL -- see below for details). |
| Flags | == NIC1394_VCFLAG_ALLOCATE (optional -- see below for details); other flags as documented in Reference section below. |

Refer to the entry on NIC1394_MEDIA_PARAMETERS in Reference section below for information on how to fill out the other fields.

If NIC1394_VCFLAG_ALLOCATE is specified, the miniport will actually allocate the channel (reserve it in the Isochronous Resource Manager's channel's register).

If the specified channel is the special value NIC1394_ANY_CHANNEL, NIC1394_VCFLAG_ALLOCATE must be specified. In this case, the miniport will allocate any available channel. The actual channel number allocated may be obtained by sending an NDIS request with OID OID_NIC1394_VC_INFO.

The protocol sets the TRANSMIT_VC and RECEIVE_VC bits in CO_MEDIA_PARAMETERS.Flags if it intends to send and receive, respectively, packets on the virtual circuit. Both TRANSMIT_VC and RECEIVE_VC may be specified together.

Multiple protocols may concurrently access the same channel, provided at most one protocol has specified the "NIC1394_VCFLAG_ALLOCATE" flag. Received packets are indicated to multiple protocols, in a manner similar to packets received on the broadcast channel (see above).

NdisClMakeCall—The same operations as described in A, except that a non-broadcast channel is specified.

NdisClCloseCall—The same Operation as described in A.

NdisCoCreateVc—The same Operation as described in A

NdisCoDeleteVc—The same Operation as described in A

C. Receiving from Multiple Channels

A protocol can receive packets on multiple channels by setting up individual virtual circuits for each channel. However, some 1394 bus driver hardware may have limitations regarding the number of individual channels that may be used for receiving. Some 1394 bus driver hardware works around this limitation by allowing the software to specify a bitmap of channels—any packets addressed to any channel on this bitmap are indicated up to the software. In one embodiment, the NDIS 1394 miniport supports this feature.

To invoke this "bitmap receive" option, the protocol sets the following NIC1394_MEDIA_PARAMETER field values:

| | |
|---|---|
| Destination.AddressType | == NIC1394 AddressType_MultiChannel |
| Destination.ChannelMap | == Initial set of channels to monitor |
| Flags | == NIC1394_VCFLAG_FRAMED |
| MaxSendBlockSize | == 0 |
| MaxSendSpeed | == 0 |
| MTU | == (refer to entry on NIC1394_MEDIA_PARAMETERS in the Reference section below) |
| Bandwidth | == 0 |
| RecvFrameTypes | == Either 0 or one or more NIC1394_FRAMETYPE_* | values(refer to the Reference section).

The protocol sets the RECEIVE_VC bits (but not TRANSMIT_VC) in CO_MEDIA_PARAMETERS.Flags. The channels specified are not actually allocated. If the protocol would like to allocate the channel, it must additionally create a separate send-only virtual circuit to that channel, specifying the NIC1394_VCFLAG_ALLOCATE bit.

Multiple protocols may set up "bitmap receive" virtual circuit, with potentially overlapping channel bitmaps. The miniport will indicate packets up on all virtual circuits that include the channel on which the packet arrived.

NdisClMakeCall—The same operations as described in A, except that NIC1394 requests for a bitmap of channels to be activated.

NdisClCloseCall—The same Operation as described in A.

NdisCoCreateVc—The same Operation as described in A

NdisCoDeleteVc—The same Operation as described in A

D. Isochronous Channel Support

A protocol sets up an isochronous (delay bounded) virtual circuit using the same parameters as for setting up a best effort virtual circuit (Section B above), with the following differences:

1. The Bandwidth field of the NIC1394_MEDIA_PARAMETER structure must be set to a nonzero number, which is interpreted to be the amount of bandwidth to be reserved for the specific isochronous channel.

2. The Flags field of NIC1394_MEDIA_PARAMETER must include the NIC1394_VCFLAG_ISOCHRONOUS value.

Implementation: NdisClMakeCall—The same operations as described in A, except that a non-broadcast channel is specified, and 1394 isochronous communication primitives are used.

NdisClCloseCall—The same Operation as described in A.

NdisCoCreateVc—The same Operation as described in A

NdisCoDeleteVc—The same Operation as described in A

E. Point-to-point Communication

A protocol can communicate with its peer on another device using 1394 bus asynchronous write operations. To send data to a remote device, the protocol sets up a "FIFO send VC" and then sends packets on this virtual circuit. A FIFO send VC is associated with a specific 64-bit address offset on a specific remote device. To set up a 64-bit address on the local machine and then receive data written to this address by remote devices, the protocol sets up a "FIFO receive VC." NDIS indicates received data as NDIS packets on this virtual circuit.

The sequence of NDIS functions called is the same as setting up a VC for communicating over a channel:

1. NdisCoCreateVc
2. NdisClMakeCall
3. NdisCoSendPackets to send packets (FIFO send VC only). NDIS calls the protocol's receive packet handler to indicate received packets (FIFO receive VC only).
4. NdisClCloseCall
5. NdisCoDeleteVc As with channel VCs, the MediaParameters→MediaSpecific→Parameters subfield of the second argument to NdisClMakeCall is set to the 1394-specific structure, NIC1394_MEDIA_PARAMETERS.

The following subsections provide more detail on setting up and using FIFO send and receive VCs.

1. Sending Data to a FIFO Address on a Remote Node

The fields in NIC1394_MEDIA_PARAMETERS identify the remote device, FIFO address offset, and other details, as indicated below:

| | |
|---|---|
| Destination.AddressType | == NIC1394 AddressType_FIFO |
| Destination.FifoAddress.UniqueID | == The EU64 unique ID of the remote device. |
| Destination.FifoAddress.Off_Low | == The low-order 32-bits of the FIFO address. |
| Destination.FifoAddress.Off_High | == The high-order 16-bits of the FIFO address. |
| Flags | == NIC1394_VCFLAG_FRAMED (optional) - refer to Reference section below. |
| Bandwidth | == 0 |
| RecvFrameTypes | == 0 |

Additionally, the protocol sets the TRANSMIT_VC bits in CO_MEDIA_PARAMETERS.Flags field. Multiple protocols can set up send FIFO VCs to the same destination FIFO address on the same remote node.

2. Setting up a Local FIFO Address to Receive Data

The fields in NIC1394_MEDIA_PARAMETERS identify remote device, FIFO address offset, and other details, as indicated below:

| | |
|---|---|
| Destination.AddressType | == NIC1394AddressType_FIFO |
| Destination.FifoAddress.UniqueID | == 0. |
| Destination.FifoAddress.Off_Low | == 0. |
| Destination.FifoAddress.Off_High | == 0. |

Note: on activation of the VC, the above fields are set, respectively, to the local node's EU64 Unique ID, and the low and high offsets of the locally allocated address associated with the FIFO.

| | |
|---|---|
| Flags | == NIC1394_VCFLAG_FRAMED (optional) - refer to Reference section below. |
| Bandwidth | == 0 |
| RecvFrameTypes | == Either 0 or one or more NIC1394_FRAMETYPE_* | values(refer to the Reference section).

Additionally, the protocol sets the RECEIVE_VC bits in CO_MEDIA_PARAMETERS.Flags field.

Multiple protocols cannot set up receive FIFO VCs with the same local FIFO address offset—a separate address offset will be assigned to each VC.

NdisClMakeCall—If this is a Transmit Vc then no 1394 operations are done here.

If this is Receive VC(specified by the flags above) then an address range is allocated on the 1394 bus. If any other node wishes to establish a Point To Point connection then it can write to the Address Range. A standard, unmodified 1394 API "AllocateAddressRange" is used to allocate the address range.

NdisClCloseCall—The Address Range is freed here. A standard, unmodified 1394 API, "FreeAddressRange" is used to free the address range NdisCoCreateVc—No 1394 call is made here.

NdisCoDeleteVc—No 1394 call is made here.

Data Fragmentation and Reassembly

The 1394 bus allows devices of differing packet-size capability to communicate with each other. This adds complication to the communications software, because the software has to deal with the differing capabilities of the devices. The NDIS1394 miniport can hide this complexity from protocols. The miniport allows protocols to send and receive packets with their peers on other devices, under the simplifying assumption that all devices have the same maximum packet size, or "maximum transfer unit" (MTU).

The miniport will fragment each packet if the remote device does not support the specified MTU. The fragmented packets are reassembled on the remote device before being passed up to protocol's peer on that device. The fragmentation and reassembly protocol is standards-based (see, e.g., RFC 2734 section 4, entitled "Link Encapsulation and Fragmentation.") The standards-based nature of this protocol allows interoperation with devices that do not implement the NIC1394-based protocol stack.

Plug and Play Features

The detection and installation of a 1394 host controller automatically triggers the installation of the associated NIC1394 miniport. Likewise, the removal of the host controller automatically triggers the removal of the associated miniport. Clients desiring to avail themselves of connection-oriented functionality over NIC1394 miniport need not include any 1394-specific code to take advantage of plug and play. Protocols (i.e. clients) are notified via standard NDIS plug'n'play notifications when the NIC1394 miniport is added or removed in response to a local 1394 host controller being added or removed from the system.

When a host controller is added to the local machine, NDIS notifies the client protocols by calling the protocol's BindAdapter handler. When the host controller is removed, NDIS notifies the protocol by calling its UnbindAdapter handler. Since this mechanism is the same for other traditional network media, such as Ethernet and ATM, this simplifies the adaptation of these protocols to the serial bus.

In one embodiment of this method, the 1394 bus driver creates the NIC1394 miniport by ejecting a Physical Device Object (PDO) of type NIC1394 each time Plug'n'Play detects a new 1394 host controller. This PDO is the child of the 1394 host controller. When the 1394 host controller is being removed, standard plug and play mechanisms ensure that the corresponding NIC1394 miniport, which is a child of the host controller, is also removed.

Remote network-capable devices can be identified by exporting a specific config-ROM unit directory, as documented in RFC 2734. The NIC1394 miniport is notified (via internal plug'n'play mechanisms) when such a device is plugged into the 1394 bus. Protocols are not notified when remote devices come and go. This is in keeping with the philosophy of making the 1394 bus look like a traditional data network. Thus protocols are shielded from the 1394-specific complexity of remote nodes arriving and leaving dynamically. However, protocols are notified when there is a transition from no remote nodes to at-least one remote node. This is achieved by using general (not 1394-specific) NDIS mechanism, specifically, NDIS send a NDIS_STATUS_MEDIA_CONNECT notification for the transition from no remote nodes to at-least one remote node, and sends a NDIS_STATUS_MEDIA_DISCONNECT notification on the transition from at-least one remote node to no remote nodes. Since these notifications are also sent by miniports for traditional media such as Ethernet or ATM, this simplifies the adaptations protocols for these existing media to run over the serial bus.

Virtual Circuit Mapping

Figure 5:
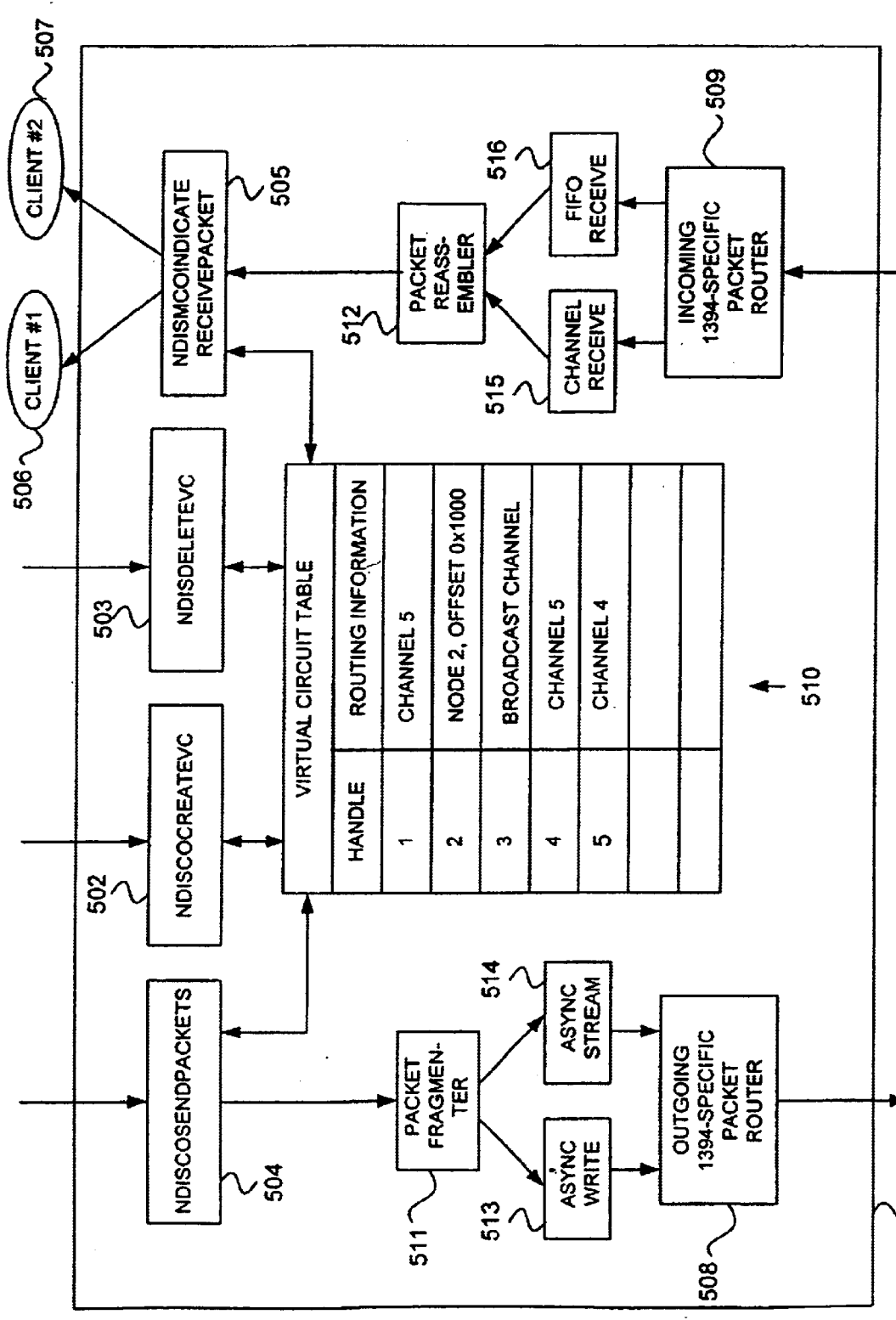
FIG. 5 shows one possible approach for implementing an NDIS 1394 miniport according to the present invention.

FIG. 5 shows one possible approach for constructing an NDIS 1394 miniport according to the inventive principles. NDIS 1394 miniport 501 maintains a virtual circuit table 510 that maps virtual circuit handles to 1394-specific routing information. As each client (or protocol driver) makes calls to NdisCoCreateVc 502 (shown conceptually as part of NDIS 1394 miniport 1394), it sets up a new virtual circuit in table 510. Each virtual circuit is assigned a handle that is used by the clients to reference a particular virtual circuit. This handle can be a memory pointer to the virtual circuit entry in the table. Each virtual circuit entry contains routing information that indicates where the packets should be sent (e.g., outgoing node identifier, channel number, or client identifier for incoming packets). The routing information could, for example, indicate that multiple clients are to receive a single packet, and in such a situation, miniport 501 replicates the packet before providing a copy to each client.

Assuming that a client sets up a virtual circuit using NdisCoCreateVc and NdisClMakeCall, it can then send packets using NdisCoSendPackets 504. For each packet transmitted on the particular virtual circuit, the virtual circuit tables 510 is referenced to determine the appropriate 1394-specific information to send the packet (e.g., node identification information and/or channel information). The packets are then sent to a packet fragmenter 511 which splits the packet into fragments according to RFC 2734. An outgoing packet router 508 then transmits the packet fragments over the 1394 bus using the routing information. The packet routers use 1394 operating system and bus specific mechanisms to actually send or receive the packet.

A client can also set up a virtual circuit (or connect to a previously created virtual circuit) to receive incoming packets. In this situation, incoming packet router 509 passes received packet fragments to the packet reassembler 512. The reassember assembles packet fragments into whole packets according to RFC 2734. The reassembly engine then refers to virtual circuit table 510 in order to determine the specific client that set up the virtual circuit. It then calls NdisMCoIndicateReceivePacket 505 which in turn calls the client's receive packets handler function.

If, as shown in FIG. 5, two different clients 506 and 507 are connected to the same virtual circuit to receiving incoming packets, then the miniport replicates each incoming packet for the particular virtual circuit and notifies each client of its copy. The "receive frame type" field in packets can be used to discriminate among packets when several protocols open "receive" virtual circuit on the same 1394 bus channel. The intent is that NIC1394 will use the RECEIVE FRAME TYPE field to selectively indicate up packets to only those protocols that are interested in the packets (as identified by the frame type).

Additionally, a single client (or protocol driver) may request that it receive packets from more than one channel on the 1394 bus. Accordingly, client 506 can, for example, set up two or more virtual circuits and indicate that it is to receive packets arriving on both channels.

According to various embodiments of the invention, serial bus channels and 1394 FIFOs can be shared by different clients. The FIFO addresses are shared because any node on the bus can write data to this address. To write to a channel or a FIFO address, one uses the standard APIs exposed by the 1394 driver. The description (section A, B, etc. above) explains handling received packets on shared channels). The semantics of shared channels for send packets are simple—the client calls NdisCoSendPackets and the packets get sent.

Isochronous bandwidth can be reserved on a per client basis. The decision whether to use the same channel or a different depends on the parameters to the make call. If the client does not explicitly specify a channel number, the miniport can always allocate a new channel for the virtual circuit. Thus to share channels, the clients must explicitly specify the same channel number. The broadcast channel is shared just like any other channel. The benefits of sharing are primarily to conserve channels. Additionally the benefit of sharing the broadcast channel is that it simplifies defining new 1394-specific protocols—the protocol definition can take advantage of the existence of a single well-known broadcast channel over which control information can be broadcast.

Figure 6:
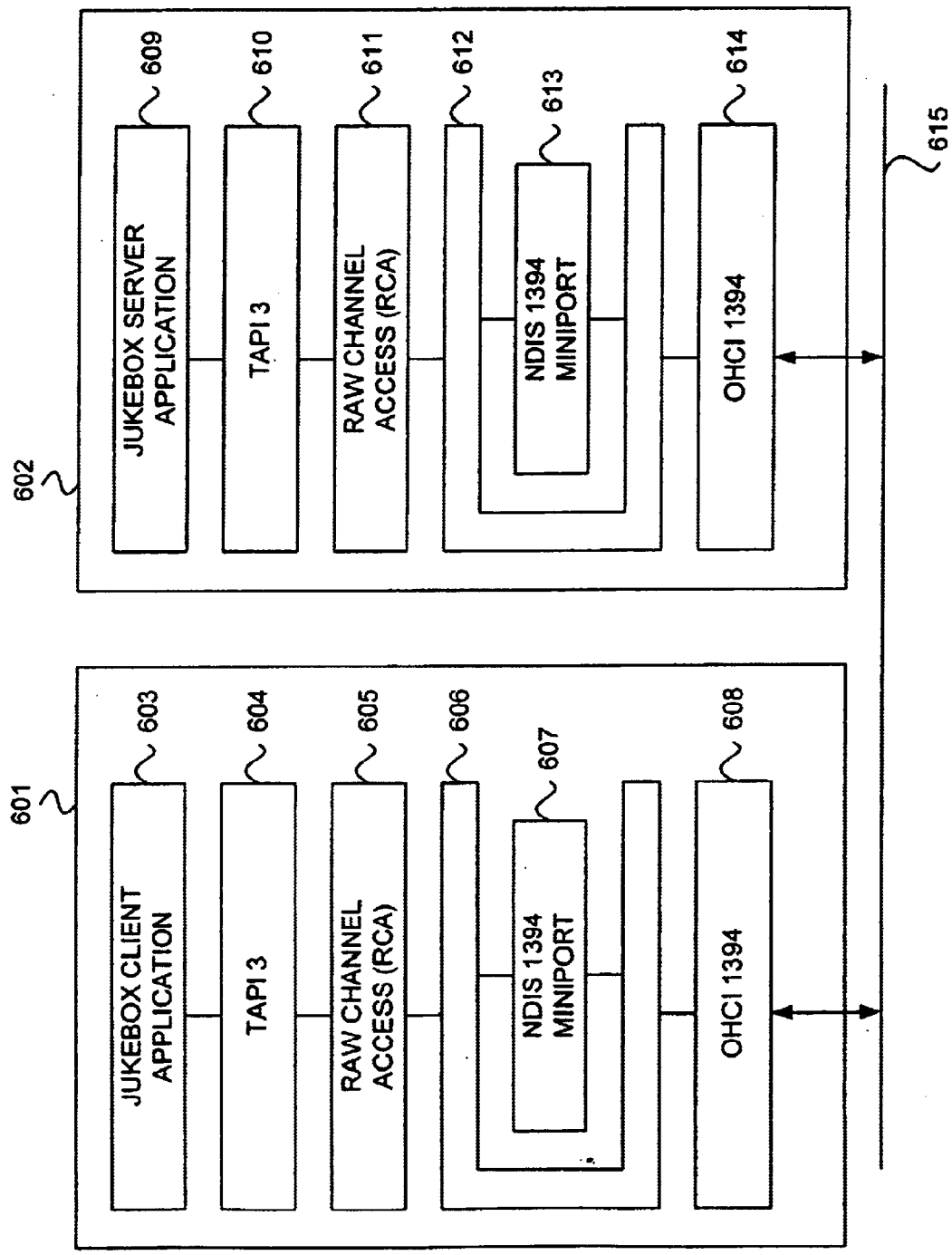
FIG. 6 shows how the inventive principles can be used in conjunction with a "jukebox" type application.

FIG. 6 shows how the inventive principles can be used in conjunction with a "jukebox" type application. As shown in FIG. 6, a jukebox client application is to receive streaming audio music from a jukebox server application 609. The two applications are located on two different IEEE 1394 nodes coupled through an IEEE 1394 serial bus 615.

According to the invention, jukebox client application 603 makes calls to conventional Telephony Application Interface (TAPI) 604 to establish a connection. TAPI 604 in turn makes calls to Raw Channel Access (RCA) functions 605 and to NDIS 606 to implement the connection. RCA 605 makes calls to NDIS 606 and to NDIS 1394 miniport 607 in order to set up a virtual circuit with jukebox server application 609 on node 602.

Jukebox server application 609 establishes a similar virtual circuit using TAPI 3 element 610, RCA 611, NDIS 612, and NDIS 1394 miniport 613. The virtual circuit used for audio streaming can use an isochronous data channel with a specified data bandwidth sufficient to support the audio streaming. TAPI includes provisions for specifying the type of call including bandwidth requirements. This is part of the TAPI3 specification. The client (here RCA) converts these general specifications to 1394-specific versions (which would include the bandwidth field specified in the NIC1394_MEDIA_PARAMETERS) by calling NdisCoRequest specifying OID_CO_TAPI_TRANSLATE_TAPI_CALLPARAMS. NdisCoRequestintumcallstheNdis1394 miniport to actually do the translation to 1394-specific parameters. In this way, RCA does not need to know any 1394-specific information.

Depending on design choices, user selection of a song from the jukebox server application 609 could result in a message being transmitted over an asynchronous data channel to node 602, while streaming audio from the jukebox server is transmitted over an isochronous data channel on the 1394 bus (using a different virtual circuit having a specified data bandwidth). However, in both cases it is preferable that the application not be required to deal with IEEE 1394-specific functions and features, such details being hidden through the software layers below it. In other words, each application can continue to use existing TAPI and RCA functions if a computer bus is changed from Ethernet, FDDI, or other media to IEEE 1394.

DETAILED NDIS FUNCTIONS

The following describes in more detail certain functions that can be used in conjunction with certain aspects of the inventive principles. Details of NDIS and related functions are available in documentation publicly available from Microsoft Corporation of Redmond, Wash.

---
NdisCoCreateVc
---
NDIS_STATUS
  NdisCoCreateVc(
    IN NDIS_HANDLE NdisBindingHandle,
    IN NDIS_HANDLE NdisAfHandle OPTIONAL,
    IN NDIS_HANDLE ProtocolVcContext,
    IN OUT PNDIS_HANDLE NdisVcHandle
  );
---

NdisCoCreateVc sets up a connection endpoint from which a client can make outgoing calls or on which a stand-alone call manager can dispatch incoming calls.
Parameters
  NdisBindingHandle
  Specifies the handle returned by NdisOpenAdapter that identifies the target NIC or virtual adapter of the next-lower driver to which the caller is bound.
  NdisAfHandle
  Specifies the handle returned by NdisClOpenAddressFamily if the caller is a client. A call manager sets this parameter to NULL if it is creating a VC for itself, such as a VC to a network switch. When it creates a VC for incoming call notifications, a call manager passes the AF handle that it saved in its per-AF state designated by the CallMgrAfContext that was passed as an input parameter to its ProtocolCmRegisterSap function.
  ProtocolVcContext
  Specifies the handle to a caller-supplied resident context area in which the caller maintains state for this VC. NDIS passes this handle back to the VC creator in all subsequent calls concerning this endpoint if the call to NdisCoCreateVc succeeds.
  NdisVcHandle
  Points to a caller-supplied variable that must be initialized to NULL when NdisCoCreateVc is called. On return from a successful call, this points to a variable that NDIS has set to its handle for the newly created VC. The caller must save this handle for subsequent calls to connection-oriented Ndis-Xxx functions.
Return Value
  NdisCoCreateVc can return one of the following:
  NDIS_STATUS_SUCCESS: NDIS created the VC successfully.
  NDIS_STATUS_RESOURCES: NDIS could not allocate sufficient memory to set up the VC.
  NDIS_STATUS_FAILURE: The given NdisAfHandle is invalid.
  NDIS_STATUS_XXX: The underlying NIC driver failed the creation of the VC for a miniport-determined reason, which NDIS has propagated to the caller.
Comments
  A client or stand-alone call manager creates a VC with NdisCoCreateVc, depending on whether the VC represents an outgoing or incoming call, respectively. In the process of VC creation, NDIS supplies an NdisVcHandle to the client, the call manager, and the NIC miniport to which both protocols are bound. This handle identifies the virtual circuit for the client, call manager, and miniport to which subsequent requests concerning the given VC are directed. Each driver must treat this VC handle as an opaque variable, passing it unmodified and uninterpreted in subsequent calls to certain connection-oriented NDIS library functions.

Usually, callers of NdisCoCreateVc store the returned NdisVcHandle in the caller-allocated state area at ProtocolVcContext. NDIS passes this handle as an input parameter to the ProtocolCoCreateVc and MiniportCoCreateVc functions of the other two drivers involved in each creation of a VC.

To make an outgoing call, a client must call NdisCoCreateVc first. As a synchronous operation, NDIS calls the underlying NIC driver's MiniportCoCreateVc finction and the call manager's ProtocolCoCreateVc function before NdisCoCreateVc returns control. If its call to NdisCoCreateVc succeeds, the client can proceed in making an outgoing call, passing the returned NdisVcHandle to NdisClMakeCall.

When its ProtocolCoReceivePacket function processes the offer of an incoming call directed to one of its registered SAPs, a call manager must call NdisCoCreateVc first. As a synchronous operation, NDIS calls the underlying NIC driver's MiniportCoCreateVc function and the client's ProtocolCoCreateVc function before NdisCoCreateVc returns control. If its call to NdisCoCreateVc succeeds, the call manager can proceed in notifying the appropriate client, passing the returned value at NdisVcHandle to NdisCmDispatchIncomingCall.

Stand-alone call managers, which register themselves with NDIS as protocols, can call NdisCoCreateVc.

Connection-oriented NIC drivers that provide integrated call-management support call NdisMCmCreateVc, instead.

Callers of NdisCoCreateVc can be running at IRQL←DISPATCH_LEVEL.

---
NdisClMakeCall
---

```
NDIS_STATUS
    NdisClMakeCall(
        IN NDIS_HANDLE NdisVcHandle,
        IN OUT PCO_CALL_PARAMETERS CallParameters,
        IN NDIS_HANDLE ProtocolPartyContext OPTIONAL,
        OUT PNDIS_HANDLE NdisPartyHandle OPTIONAL
        );
```

NdisClMakeCall sets up an outgoing call on a client-created VC.

Parameters

NdisVcHandle

Specifies the handle returned by a preceding call to NdisCoCreateVc.

CallParameters

Points to a structure of type CO_CALL_PARAMETERS in which the caller has specified the attributes for this connection, such as the address of the target for the call, latency, bandwidth, and quality of service if the network medium and address family supported by the call manager permits QoS specifications.

ProtocolPartyContext

Optionally specifies a caller-supplied handle to a resident context area in which the client will maintain per-party state for the initial party on its multipoint VC. This parameter is NULL if the given VC does not represent a multipoint connection. For a multipoint VC, NDIS passes this handle back to the client's ProtocolClXxx functions in all subsequent calls that affect this particular party.

NdisPartyHandle

Points to a caller-supplied variable, usually in the caller-allocated party context area, in which NDIS returns a handle representing the initial party to the multipoint connection if the request to set up an outgoing call is successful. If ProtocolPartyContext is NULL, this variable, usually in the client's VC context area, also is set to NULL on completion of outgoing-call setup.

Return Value

When NdisClMakeCall returns anything other than NDIS_STATUS_PENDING, the client should make an internal call to its ProtocolCIMakeCallComplete function. Otherwise, NDIS calls the client's ProtocolCIMakeCallComplete function when this operation is completed.

Comments

NdisClMakeCall sets up the attributes of a client-created VC for a client-initiated outgoing call. The client must set up the VC with NdisCoCreateVc before it attempts to make an outgoing call. A call to NdisClMakeCall causes NDIS to forward this request to the ProtocolCmMakeCall function of the call manager with which the client shares the given NdisVcHandle. The CM is responsible for validating the given data at CallParameters. It can modify this client-supplied data while negotiating with relevant network components and can return different traffic parameters than the client originally gave to NdisClMakeCall. The client's ProtocolCIMakeCallComplete function is responsible for accepting the modified call parameters if this occurs or for tearing down the call if the CM's proposed call parameters are unacceptable.

Consequently, the data at CallParameters must remain available to the call manager at least for the duration of call setup. The client cannot free this buffer when NdisClMakeCall returns NDIS_STATUS_PENDING. It must defer releasing this client-allocated resource until its ProtocolCIMakeCallComplete function is called.

If NdisClMakeCall sets up a multipoint connection, the client is establishing the traffic parameters globally for the given VC, unless the underlying network medium supports per-party traffic parameters. For example, no matter how many parties a client subsequently adds on an ATM multipoint VC with NdisClAddParty, these parties will all share the same traffic parameters on their multipoint connection. A client on an ATM network cannot specify bandwidth, QoS, and so forth, as CallParameters on a per-party basis. In addition, if a client on an ATM network changes the QoS on an established multipoint VC with NdisClModifyCallQoS, its change affects all parties on the multipoint VC.

The client's ProtocolCIMakeCallComplete function should check the input Status for NDIS_STATUS_SUCCESS before it uses any returned handle at NdisPartyHandle. If the call manager fails the request to set up a call on a multipoint connection, the value of this client-supplied variable is invalid.

Callers of NdisClMakeCall can be running at IRQL←DISPATCH_LEVEL.

---
NdisClCloseCall
---

```
NDIS_STATUS
    NdisClCloseCall(
        IN NDIS_HANDLE NdisVcHandle,
        IN NDIS_HANDLE NdisPartyHandle OPTIONAL,
        IN PVOID Buffer OPTIONAL,
        IN UINT Size
        );
```

NdisClCloseCall requests that a call on the specified VC be torn down.

Parameters

NdisVcHandle

Specifies the handle to the VC of the call being closed or disconnected. This handle was supplied by NDIS when the VC was originally created with NdisCoCreateVc, whether by the client in preparation for making an outgoing call or by the call manager in preparation for dispatching an incoming call to the client.

NdisPartyHandle

Specifies the handle to the last party to be dropped on a multipoint VC or NULL. If this is a multipoint VC, the client obtained this handle either from a preceding call to NdisClMakeCall or NdisClAddParty.

Buffer

Points to a caller-allocated buffer containing any data to be transmitted to the party on the remote node when the connection is closed. Depending on the underlying medium, this pointer can be NULL. For example, this parameter is NULL on ATM networks.

Size

Specifies the size in bytes at Buffer, zero if Buffer is NULL.

Return Value

When NdisClCloseCall returns anything other than NDIS_STATUS_PENDING, the client should make an internal call to its ProtocolCICloseCallComplete function. Otherwise, NDIS calls the client's ProtocolCICloseCallComplete function when this operation is completed.

Comments

Clients usually call NdisClCloseCall in any one of the following circumstances:

To close an established call, whether the call was initiated by the client with NdisClMakeCall or was offered by a remote peer and accepted by the client's ProtocolClIncomingCall function.

From the ProtocolClIncomingCloseCall function to tear down an established call. This occurs when the remote party closes an incoming call that the remote party originally initiated and that the client accepted. For client-initiated outgoing calls, this occurs either when the remote party closes the point-to-point connection on the remote node or when the last remaining party on a multipoint VC closes the call on the remote node.

From the ProtocolClMakeCallComplete function to tear down a client-initiated attempt to make an outgoing call. This occurs if the call manager has modified the client-specified call parameters passed to NdisClMakeCall and the client finds these modifications unacceptable.

From the ProtocolClIncomingQoSChange function to tear down an established call. This occurs if a QoS change proposed by the other party on the VC is unacceptable to the client.

From the ProtocolClModifyCallQoSComplete function to tear down an established call. This occurs if a client-proposed QoS change on the VC is not accepted and the CM-modified QoS returned to ProtocolClModifyCallQoSComplete is unacceptable to the client.

A client's call to NdisClCloseCall causes NDIS to mark the NdisVcHandle as closing and to call the CM's ProtocolCmCloseCall function.

To tear down an established call on a client-created multipoint VC, the client must call NdisClDropParty one or more times to release all but the last party on the VC before it calls NdisClCloseCall. The call manager will fail any client's request to close a multipoint call if the given VC still has more than one party connected. The NdisPartyHandle passed to NdisClCloseCall can be any valid handle that the client obtained from its preceding calls to NdisClAddParty or NdisClMakeCall with the given NdisVcHandle.

As remote parties to a client-initiated multipoint call request that their connections be closed, NDIS calls that client's ProtocolClDropParty function as long as more than one outstanding party exists on the client-created multipoint VC. When the last remaining remote party closes its connection, NDIS calls the client's ProtocolClIncomingCloseCall function instead. Consequently, the ProtocolClIncomingCloseCall function of any client that sets up multipoint connections must identify the last remaining party on its multipoint VCs and pass the appropriate NdisPartyHandle to NdisClCloseCall.

After the client releases an NdisPartyHandle with NdisClCloseCall, it can release (or reinitialize for reuse) the resources for the per-party state it was maintaining. However, the client cannot release or reuse its per-VC resources in a similar manner on completion of the operation it initiated with NdisClCloseCall because the NdisVcHandle, which cannot be reused to make another call because it is marked as closing, is still valid until the VC is destroyed. Either the client must call NdisCoDeleteVc if it created the VC for an outgoing call before it releases or reinitializes its per-VC resources, or the client must defer the release or reinitialization of these resources until its ProtocolCoDeleteVc function is called.

Callers of NdisClCloseCall can be running at IRQL←DISPATCH_LEVEL.

---

NdisMCoIndicateReceivePacket

---

```
VOID
    NdisMCoIndicateReceivePacket(
        IN NDIS_HANDLE NdisVcHandle,
        IN PPNDIS_PACKET PacketArray,
        IN UINT NumberOfPackets
        );
```

NdisMCoIndicateReceivePacket notifies NDIS that an array of packets on a VC is available to be forwarded to the appropriate client or call manager.

Parameters

NdisVcHandle

Specifies the handle identifying the VC. The NIC driver originally obtained this handle as an input parameter to its MiniportCoCreateVc function, either when a client set up an outgoing call or when the call manager created a VC for a client-registered SAP on which to indicate an incoming-call notification.

PacketArray

Points to an array of packet descriptor pointers, with each descriptor set up by the caller to specify the received data.

NumberOfPackets

Specifies how many pointers are in the array at PacketArray. The value must be at least one.

Comments

A call to NdisMCoIndicateReceivePacket causes NDIS to call the ProtocolCoReceivePacket function of the client or call manager that shares the given NdisVcHandle with the connection-oriented NIC driver. Whether a connection-oriented NIC driver makes multipacket or single-packet receive indications is implementation-dependent. However, multipacket indications yield better performance.

Before it calls NdisMCoIndicateReceivePacket, the miniport must set up the packet array as follows:

Each element at PacketArray is the pointer to a packet descriptor, which the caller allocated from packet pool with NdisAllocatePacket.

All buffer descriptors chained to such a packet descriptor were allocated from buffer pool with NdisAllocateBuffer. The miniport must call NdisAdjustBufferLength with any buffer descriptor mapping a receive buffer on the NIC that contains less received data than the full range of the receive buffer so that the buffer descriptor will map only the received data for the indication. (The NIC driver must readjust the mapping with NdisAdjustBufferLength when it regains ownership of such a buffer descriptor, as well.)

If the miniport indicates timestamps for receives, it must set the TimeReceived or TimeSent members in the NDIS_PACKET_OOB_DATA associated with the packet descriptor using the NDIS_SET_PACKET_TIME_RECEIVED and/or NDIS_SET_PACKET_TIME_SENT macros. It can call NdisGetCurrentSystemTime once to get the value to be set as the receive timestamp for all packets of a particular array.

The HeaderSize in the out-of-band data block must match the header size of each received packet for the connection-oriented medium.

If the driver indicates any additional out-of-band information with receives, it must set the SizeMediaSpecificInfo to the number of bytes of information supplied in the caller-allocated buffer at MediaSpecificInformation in the OOB block. The miniport can use the NDIS_SET_

PACKET_MEDIA_SPECIFIC_INFO macro to set these values. Otherwise, SizeMediaSpecificInfo should be zero, and MediaSpecificInformation should be NULL.

The miniport can set the Status member of the out-of-band data block to NDIS_STATUS_RESOURCES if it needs to retain ownership of the packet descriptor(s) and associated buffer descriptor(s) for some packet(s) in a particular indication.

Setting NDIS_STATUS_RESOURCES forces NDIS to indicate each such packet descriptor, one at a time, to the protocol that shares the NdisVcHandle, thereby forcing that client or call manager to copy the packet data and release each packet descriptor (and the associated buffers) back to the miniport. Otherwise, the call to NdisMCoIndicateReceivePacket gives the protocol exclusive, read-only access to the buffers chained to each packet descriptor until the packet descriptor is returned to the miniport's MiniportReturnPacket function.

The miniport does not have to examine the status of indicated packets on return of NdisMCoIndicateReceivePacket:

If the miniport set the packet's Status to NDIS_STATUS_SUCCESS before indicating up the packet descriptor, the packet's Status is always NDIS_STATUS_PENDING on return of NdisMCoIndicateReceivePacket. NDIS subsequently returns the packet descriptor to the miniport's MiniportReturnPacket function with the packet's Status set to NDIS_STATUS_SUCCESS.

If the miniport set the packet's Status to NDIS_STATUS_RESOURCES before indicating up the packet descriptor, the packet's Status is always NDIS_STATUS_SUCCESS on return of NdisMCoIndicateReceivePacket.

When the miniport regains ownership of an indicated packet descriptor, it can prepare the associated out-of-band data blocks for reuse by passing the pointer returned by NDIS_OOB_DATA_FROM_PACKET to NdisZeroMemory. As an alternative, the miniport can simply reset the relevant member(s) at the subsequent receive with the NDIS_SET_PACKET_XXX macro(s) or with the pointer returned by NDIS_OOB_DATA_FROM_PACKET. However, a miniport should never pass a packet descriptor pointer to NdisZeroMemory, because doing this destroys the packet descriptor, rendering it unusable for subsequent receive indications.

After some miniport-determined number of calls to NdisMCoIndicateReceivePacket from its MiniportHandleInterrupt function, the miniport must call NdisMCoReceiveComplete.

If a protocol does not return the miniport-allocated resources for a receive indication promptly enough, the NIC driver can call NdisMCoIndicateStatus with NDIS_STATUS_RESOURCES to alert the offending protocol that the NIC driver is running low on available packet or buffer descriptors (or even on NIC receive buffer space) for subsequent receive indications.

Callers of NdisMCoIndicateReceivePacket can be running at IRQL DISPATCH_LEVEL. However, a NIC driver generally makes this call from its MiniportHandleInterrupt function, which always runs at IRQL DISPATCH_LEVEL.

| NdisCoDeleteVc |
|---|
| NDIS_STATUS<br>NdisCoDeleteVc(<br>    IN NDIS_HANDLE NdisVcHandle<br>    ); |

NdisCoDeleteVc destroys a caller-created VC.
Parameters
  NdisVcHandle
    Specifies the handle identifying the VC to be deleted. The caller originally obtained this handle from NdisCoCreateVc.
  Return Value
    NdisCoDeleteVc can return one of the following:
    NDIS_STATUS_SUCCESS: NDIS deleted the VC.
    NDIS_STATUS_NOT_ACCEPTED: The VC is still active, so it could not be deleted.
    NDIS_STATUS_CLOSING: This call is redundant, but deactivation on the given VC is still pending.
Comments
  When a protocol calls NdisCoDeleteVc, there must be no outstanding calls on the given VC and that VC already has been deactivated. To meet these requirements implies that the following conditions hold:

If the call tear-down was initiated by a local client, that client has already called NdisClCloseCall with the given NdisVcHandle and its close-call request has completed successfully. If the call tear-down was initiated by a remote client, the stand-alone call manager has already called NdisCmDeactivateVc with the given NdisVcHandle and its deactivation request has completed successfully.

Only the protocol that created a particular VC can delete that VC. A call to NdisCoDeleteVc causes NDIS to call both the underlying NIC driver's MiniportCoDeleteVc function and the ProtocolCoDeleteVc function of the client or call manager with which the caller shares the NdisVcHandle.

When NdisCoDeleteVc returns control, the NdisVcHandle is no longer valid.

Stand-alone call managers, which register themselves with NDIS as protocols, can call NdisCoDeleteVc. Connection-oriented NIC miniports that provide integrated call-management support call NdisMCmDeleteVc instead.

Callers of NdisCoDeleteVc can be running at IRQL←DISPATCH_LEVEL.

| NdisOpenAdapter |
|---|
| VOID<br>  NdisOpenAdapter(<br>    OUT PNDIS_STATUS Status,<br>    OUT PNDIS_STATUS OpenErrorStatus,<br>    OUT PNDIS_HANDLE NdisBindingHandle,<br>    OUT PUINT SelectedMediumIndex,<br>    IN PNDIS_MEDIUM MediumArray,<br>    IN UINT MediumArraySize,<br>    IN NDIS_HANDLE NdisProtocolHandle,<br>    IN NDIS_HANDLE ProtocolBindingContext,<br>    IN PNDIS_STRING AdapterName,<br>    IN UINT OpenOptions,<br>    IN PSTRING AddressingInformation OPTIONAL,<br>    ); |

NdisOpenAdapter sets up a binding between the calling protocol and a particular underlying NIC driver or NDIS intermediate driver.
Parameters
  Status
    Points to a caller-supplied variable that can be one of the following values on return from this function:
    STATUS_SUCCESS: The requested binding is now set up so the caller can use the values returned at NdisBindingHandle and SelectedMediumIndex in subsequent calls to NdisXxx.
    NDIS_STATUS_PENDING: The requested operation is being handled asynchronously, and the caller's Protocol- OpenAdapterComplete function will be called when the open is completed.

NDIS_STATUS_RESOURCES: The requested operation failed because NDIS could not allocate sufficient memory or initialize state it uses to track an open binding.

NDIS_STATUS_ADAPTER_NOT_FOUND: The requested operation failed because the name at AdapterName could not be found in the system object namespace.

NDIS_STATUS_UNSUPPORTED_MEDIA: The array at MediumArray did not specify any medium that is supported by NDIS or by the underlying driver.

NDIS_STATUS_CLOSING: Either the caller or the physical or virtual device designated at AdapterName is being closed.

NDIS_STATUS_OPEN_FAILED: The open attempt failed for none of the preceding specific reasons. For example, possibly NDIS could not initialize the filter package for the selected medium.

OpenErrorStatus

Points to a caller-supplied variable that can contain an NDIS_STATUS_XXX error supplying more information if NdisOpenAdapter returns an error at Status. For example, the driver of a Token Ring NIC might return a ring error in this variable.

NdisBindingHandle

Points to a caller-supplied variable in which NDIS returns a handle representing a successful binding between the caller and the given physical or virtual NIC specified at AdapterName.

SelectedMediumIndex

Points to a caller-supplied variable in which NDIS returns the index of the array element that specifies the type of media the underlying NDIS driver uses.

MediumArray

Points to an array of NDIS_MEDIUM-type values specifying the types of media the caller can support. Possible elements include any proper subset of the following:

NdisMedium802_3: Specifies an Ethernet (802.3) network.

NdisMedium802_5: Specifies a Token Ring (802.5) network.

NdisMediumFddi: Specifies a Fiber Distributed Data Interface (FDDI) network.

NdisMediumWan: Specifies a wide area network. This type covers various forms of point-to-point and WAN NICs, as well as variant address/header formats that must be negotiated between the protocol driver and the underlying driver after the binding is established.

NdisMediumLocalTalk: Specifies a LocalTalk network.

NdisMediumDix: Specifies an Ethernet network for which the drivers use the DIX Ethernet header format.

NdisMediumArcnetRaw: Specifies an ARCNET network.

NdisMediumArcnet878_2: Specifies an ARCNET (878.2) network.

NdisMediumAtm: Specifies an ATM network. Connection-oriented client protocols can bind themselves to an underlying miniport that returns this value. Otherwise, legacy protocols bind themselves to the system-supplied LanE intermediate driver, which reports its medium type as either of NdisMedium802_3 or NdisMedium802_5, depending on how the LanE driver is configured by the network administrator.

NdisMediumWirelessWan: Specifies a wireless network. This type covers various wireless media that do not include the infrared wireless types designated by NdisMediumIrda.

NdisMediumIrda: Specifies an infrared (IrDA) network.

NdisMediumCoWan: Specifies a wide area network in a connection-oriented environment.

NdisMedium1394: Specifies an IEEE 1394 (fire wire) network.

MediumArraySize

Specifies the number of elements at MediumArray.

NdisProtocolHandle

Specifies the handle returned by NdisRegisterProtocol.

ProtocolBindingContext

Specifies the handle for a caller-supplied resident context area in which the protocol maintains state about this binding after it has been established.

AdapterName

Points to a counted string, specified in the system-default character set, naming the NIC or the virtual adapter of an underlying NDIS driver that exports a set of upper-edge (MiniportXxx) functions. For Windows 2000 drivers, this counted string contains Unicode characters.

OpenOptions

Specifies a bitmask containing flags the caller passes to the next-lower driver, assumed to be a NIC driver. Currently, this parameter is reserved for system use.

AddressingInformation

Points to an optional variable-length counted string containing information specific to the underlying NIC that the NIC driver can use to program the netcard. This pointer can be NULL. If it is supplied, the addressing information must remain valid until the open operation completes. An underlying NIC driver that supports an asynchronous modem can use this information for dialing.

Comments

A protocol driver calls NdisOpenAdapter from its ProtocolBindAdapter function. NDIS no longer supports calling NdisOpenAdapter from the DriverEntry function, which was an option available to legacy (V3.0) protocols. NDIS no longer supports V3.0 protocols. NDIS fails any attempt to call NdisOpenAdapter outside the context of ProtocolBindAdapter.

The string at AdapterName remains valid only until NdisOpenAdapter returns control, even if it returns NDIS_STATUS_PENDING at Status.

The variables at NdisBindingHandle and SelectedMediumIndex should be ignored until the ProtocolOpenAdapterComplete function is called if NdisOpenAdapter returns NDIS_STATUS_PENDING. Because these variables can remain invalid until ProtocolOpenAdapterComplete is called, they cannot be on the stack. Usually, these variables reside in the ProtocolBindingContext area since this handle is an input parameter to ProtocolOpenAdapterComplete.

A protocol driver should keep the handle returned at NdisProtocolHandle. It is a required parameter to other NdisXxx functions that the driver calls subsequently. The supplied ProtocolBindingContext is an input parameter to the caller's ProtocolXxx functions, so protocols usually pass an NdisProtocolHandle pointer to a variable somewhere in the caller-allocated context area in their calls to NdisOpenAdapter.

The caller uses the value returned at SelectedMediumIndex in subsequent calls to NdisRequest and/or NdisCoRequest. The OIDs it sets in the request packet depend on the returned NdisMediumXxx. For example, if NdisMediumAtm is returned at SelectedMediumIndex, the protocol driver calls NdisCoRequest when specifying OID_ATM_XXX or OID_CO_XXX codes, and NdisRequest when specifying OID_GEN_XXX codes.

If NdisMediumWan is returned at SelectedMediumIndex, the protocol driver calls NdisRequest specifying OID_

WAN_MEDIUM_SUBTYPE in a query to determine which of the WAN media types the underlying driver uses.

If a previously issued global query of OID_NETWORK_TYPE for wireless media indicates that the driver and underlying NIC support more than one NdisMediumWirelessWan-type medium, the protocol must select one of the supported media as soon as NDIS has set up the binding and before the protocol selects the header format.

As another example, if NdisMedium802_3 is returned, a protocol driver can determine whether the underlying driver supports packet priority by calling NdisRequest specifying OID_802_3_MAC_OPTIONS as a query to check whether the underlying driver sets the flags with NDIS_802_3_MAC_OPTION_PRIORITY. If this flag is set when the query is complete, the protocol driver can pass down prioritized packets to the underlying NIC driver with NdisSendPackets. The protocol driver can expect its ProtocolReceivePacket function to get indications of prioritized packets if the underlying driver also supports multipacket receive indications. Callers of NdisOpenAdapter run at IRQL PASSIVE_LEVEL.

---
NdisCoSendPackets
---

```
VOID
    NdisCoSendPackets(
        IN NDIS_HANDLE NdisVcHandle,
        IN PPNDIS_PACKET PacketArray,
        IN UINT NumberOfPackets
        );
```

NdisCoSendPackets forwards a multipacket send on a particular VC to the underlying NIC driver for transmission over the network.

Parameters

NdisVcHandle

Specifies the handle to the VC, thereby identifying the target of the send.

PacketArray

Points to an array of pointers to caller-allocated packet descriptors. Each packet descriptor in the array has chained buffer descriptors mapping buffers containing the data that the underlying NIC driver should transmit over the wire.

Each packet descriptor also has an associated NDIS_PACKET_OOB_DATA block, which the caller can set up with any timestamp and/or medium-specific out-of-band information relevant to the underlying driver and network medium.

NumberOfPackets

Specifies the number of pointers at PacketArray.

Comments

A call to NdisCoSendPackets causes NDIS to call the NIC driver's MiniportCoSendPackets function. NDIS submits packet arrays to the underlying driver's MiniportCoSendPackets function in the same order as they are passed to NdisCoSendPackets. Before a protocol calls NdisCoSendPackets, it should set up the array of packet pointers in the same order as the packets should be sent over the wire.

The caller of NdisCoSendPackets should test the returned status for each packet descriptor in such an array individually when its ProtocolCoSendComplete function is called. While NDIS always submits packets for transmission in the FIFO order determined by the sending protocol, the underlying NIC driver might complete such sends in random order.

As soon as a protocol calls NdisCoSendPackets, it relinquishes ownership of the following:

All packet descriptors accessible at PacketArray

All buffers mapped by the buffer descriptors chained to those packet descriptors All out-of-band data blocks associated with the packet descriptors, including any medium-specific buffers specified in the OOB blocks The allocating protocol regains ownership of these resources, one packet descriptor at a time, as its ProtocolCoSendComplete function is called with each packet descriptor in the array that it passed to NdisCoSendPackets.

Then, ProtocolCoSendComplete can either release the resources the protocol allocated or prepare these resources for reuse. During periods of average-to-high network I/O traffic, reusing the packet descriptors and buffers that a protocol allocates yields better performance than releasing buffers and the packet descriptor, only to reallocate them almost immediately for a subsequent send. However, any protocol that manages its usage of system resources carefully would not retain a large set of reusable packet descriptors with mapped buffers indefinitely after a period of high traffic falls into a sustained period of very low I/O demand. When ProtocolCoSendComplete reuses packet descriptors, it must save the buffer descriptors chained to each input packet descriptor with calls to an NdisUnchainBufferAtXxx function before it calls NdisReinitializePacket with the input packet descriptor.

Callers of NdisCoSendPackets can be running at IRQL←DISPATCH_LEVEL.

REFERENCE

The following reference information provides additional details for one possible implementation.

1. NDIS 1394 OIDS

The protocols send object identifiers (OIDS) down to the miniport using the NDIS function NdisCoRequest. OIDS are sent to query for 1394-specific information, as well as to perform certain 1394-specific tasks, such as issuing a bus reset, or changing the characteristics of an established VC.

1.1. OID_1394_CHANGE_CHANNEL_CHARACTERISTICS

The OID_1394_CHANGE_CHANNEL_CHARACTERISTICS OID is used to dynamically change characteristics of an active channel VC. The NIC1394_CHANNEL_CHARACTERISTICSstructure is filled out by the miniport and returned to the protocol. Refer to the documentation on NIC1394_CHANNEL_CHARACTERISTICS for details.

1.2. OID_1394_LOCAL_NODE_INFO

The OID_1394_LOCAL_NODE_INFO OID is used to query basic information about the miniport. The NIC1394_LOCAL_NODE_INFO structure is filled out by the miniport and returned to the protocol. Refer to the documentation on NIC1394_LOCAL_NODE_INFO for details.

1.3. OID_1394_ISSUE_BUS_RESET

The OID_1394_ISSUE_BUS_RESET OID is issued if the protocol would like to force a 1394 bus reset.

1.4. OID_1394_VC_INFO

The OID_1394_VC_INFO OID is used to query information about a specific VC. The NIC1394_VC_INFO structure is filled out by the miniport and returned to the protocol. Refer to the documentation on NIC1394_VC_INFO for details.

2. NDIS 1394 Structures

```
2.1. NIC1394_ADDRESS_TYPE
// enum to identify the modes of transmission on the 1394 bus.
//
//
typedef enum _NIC1394_ADDRESS_TYPE
{
    NIC1394AddressType_Channel,    // Indicates this is a channel
                                    address
    NIC1394AddressType_FIFO,       // Indicates this is a FIFO address
    NIC1394AddressType_MultiChannel // Indicates this is
                                    multiple-channel address
} NIC1394_ADDRESS_TYPE, *PNIC1394_ADDRESS_TYPE;
2.2. NIC1394_CHANNEL_CHARACTERISTICS
//
// The structure for dynamically changing channel characteristics.
//
typedef struct _NIC1394_CHANNEL_CHARACTERISTICS
{
    UINT64 ChannelMap; // Must be zero unless specifying a Multi-
    channel VC.
    ULONG Speed; //Same units as
            NIC1394_MEDIA_PARAMETERS.MaxSendSpeed.
            // Special value-1 means "no change in speed."
} NIC1394_CHANNEL_CHARACTERISTICS,
*PNIC1394_CHANNEL_CHARACTERISTICS;
2.3. NIC1394_DESTINATION
//
// General form of a 1394 destination, which can specify either a 1394
// channel or a FIFO address. This structure forms part of the 1394
// media-specific parameters.
//
typedef struct _NIC1394_DESTINATION
{
    union
    {
        UINT       Channel; // IEEE1394 channel number.
        NIC1394_FIFO_ADDRESS FifoAddress; // IEEE1394
                            NodeID and address offset.
        UINT64     Channel Map; // Identifies multiple channels.
    };
    NIC1394_ADDRESS_TYPE   AddressType;
    // Address- asynch or isoch
} NIC1394_DESTINATION, *PNIC1394_DESTINATION;
2.4. NIC1394_ENCAPSULATION_HEADER
//
// Unfragmented encapsulation header.
//
typedef struct _NIC1394_ENCAPSULATION_HEADER
{
    // Set to the 16-bit Node ID of the sending node, in machine-byte
    // order.
    // Set to zero if the Node ID of the sender is not known.
    //
    //
    USHORT NodeId;
    // The EtherType field is set to the byte-swapped version of one of the
    // constants defined immediately below.
    //
    USHORT EtherType;
    // Ethertypes in machine byte order. These values need to be
    // byteswapped before they are sent on the wire.
    //
    #define NIC1394_ETHERTYPE_IP 0x800
    #define NIC1394_ETHERTYPE_ARP 0x806
    #define NIC1394_ETHERTYPE_MCAP 0x8861
} NIC1394_ENCAPSULATION_HEADER,
*PNIC1394_ENCAPSULATION_HEADER;
2.5. NIC1394_FIFO_ADDRESS
//
// 1394 FIFO Address, consisting of the 64-bit UniqueID and the
// 48-bit address offset.
//
typedef struct _NIC1394_FIFO_ADDRESS
{
    UINT64     UniqueID;
    ULONG      Off_Low;
    USHORT     Off_High;
```

-continued

```
} NIC1394_FIFO_ADDRESS, *PNIC1394_FIFO_ADDRESS;
2.6. NIC1394_LOCAL_NODE_INFO
//
// the structure for returning basic information about the miniport
// returned in response to OID_NIC1394_LOCAL_NODE_INFO.
// Associated with the address family handle.
//
typedef struct _NIC1394_LOCAL_NODE_INFO
{
    UINT64         UniqueID;  // This node's 64-bit Unique ID.
    ULONG          BusGeneration; // 1394 Bus generation ID.
    NODE_ADDRESS   NodeAddress;   // Local nodeID for
                                   // the current bus
                                   generation.
    USHORT         Reserved;  // Padding.
    UINT           MaxRecvBlockSize; // Maximum size,
                                     // in bytes, of blocks
                                     // that can be read.
    UINT           MaxRecvSpeed;     // Max speed which can be
                                     // accepted -- minimum
                                     // of the max local link speed and
                                     // the max local PHY speed.
} NIC1394_LOCAL_NODE_INFO,
*PNIC1394_LOCAL_NODE_INFO;
2.7. NIC1394_MEDIA_PARAMETERS
//
// NOTES:
// The CO_MEDIA_PARAMETERS.Flags field for FIFO vcs
// must specify either TRANSMIT_VC or RECEIVE_VC, not
// both. If RECEIVE_VC is specified for a FIFO vc, this vc is used to
// receive on a local FIFO. In this case, the Destination.RecvFIFO
// field must be set to all-0s when creating the vc. On activation of
// the vc, this field of the updated media parameters will
// contain the local nodes unique ID and the allocated FIFO address.
//
// Multi-channel VC MUST specify RECEIVE_VC and not
// TRANSMIT_VC.
// Only one multi-channel VC is supported per adapter.
//
// 1394 Specific Media parameters - this is the Media specific
// structure for 1394 that goes into
// MediaParameters->MediaSpecific.Parameters.
//
typedef struct _NIC1394_MEDIA_PARAMETERS
{
    //
    // Identifies destination type (channel or FIFO) and
    // type-specific address.
    //
    NIC1394_DESTINATION   Destination;
    //
    // Bitmap encoding characteristics of the vc. One or more
    // NIC1394_VCFLAG_* values.
    //
    ULONG              Flags;
    //
    // Maximum size, in bytes, of blocks to be sent on this vc.
    // Must be set to 0 if this is a recv-only VCs. The miniport
    // will choose a block size that is a minimum of this value
    // and the value dictated by the bus speed map. Special value
    // (ULONG-1) indicates "maximum possible block size."
    UINT               MaxSendBlockSize;
    //
    // One of the SCODE_* constants defined in 1394.h. Indicates
    // the maximum speed to be used for blocks sent on this vc.
    // Must be set to 0 if this is a recv-only VC. The miniport will
    // choose a speed that is a minimum of this value and the value
    // dictated by the bus speed map. Special value (ULONG-1) indicates
    // "maximum possible speed."
    //
    //
    UINT               MaxSendSpeed;
    //
    // Size, in bytes, of the largest packet that will be sent or received
    // on this VC. The miniport may use this information to set up
    // internal buffers for link-layer fragmentation and reassembly.
    // The miniport will fail attempts to send packets and will
    // discard received packets if the size of these packets is
    // larger than the MTU.
```

```
    //
    UINT            MTU;
    //
    // Amount of bandwidth to reserve, in units of bytes per
    // isochronous frame. Applies only for isochronous transmission,
    // and must be set to 0 for asynchronous transmission (i.e.,
    // if the NIC1394_VCFLAG_ISOCHRONOUS bit is 0).
    //
    UINT            Bandwidth;
    //
    // One or more NIC1394_FRAMETYPE_* values. The
    // miniport will attempt to send up only pkts with these protocols.
    // However it may send other pkts. The client should be able to
    // deal with this. Must be set to 0 if no framing is used (i.e.,
    // if the NIC1394_VCFLAG_FRAMED bit is 0).
    //
    ULONG           RecvFrameTypes;
} NIC1394_MEDIA_PARAMETERS,
*PNIC1394_MEDIA_PARAMETERS;
//
// NIC1394_MEDIA_PARAMETERS.Flags bitfield values
//
//
// Indicates VC will be used for isochronous transmission.
//
#define NIC1394_VCFLAG_ISOCHRONOUS      (0x1 <<1)
//
// Indicates that the vc is used for framed data. If set, the miniport will
// implement link-level fragmentation and reassembly. If clear,
// the miniport will treat data sent and received on this vc
// as raw data.
//
#define NIC1394_VCFLAG_FRAMED           (0x1 <<2)
//
// Indicates the miniport should allocate the necessary bus resources.
// Currently this only applies for non-broadcast channels, in which case
// the bus resources consist of the network channel number and (for
// isochronous vc's) the bandwidth specified in Bandwidth field.
// This bit does not apply (and should be 0) when creating the
// broadcast channel and either transmit or receive FIFO vcs.
//
#define NIC1394_VCFLAG_ALLOCATE         (0x1 <<3)
//
// End of NIC1394_MEDIA_PARAMETERS.Flags bitfield values.
//
//
// NIC1394_MEDIA_PARAMETERS.FrameType bitfield values
//
#define NIC1394_FRAMETYPE_ARP           (0x1<<0)
                                        // Ethertype 0x806
#define NIC1394_FRAMETYPE_IPV4          (0x1<<1)
                                        // Ethertype 0x800
#define NIC1394_FRAMETYPE_IPV4MCAP      (0x1<<2)
                                        // Ethertype 0x8861
2.8. NIC1394_VC_INFO
//
// The structure for returning basic information about the specified vc
// returned in response to OID_NIC1394_VC_INFO. Associated with
// a vc handle
//
typedef struct_NIC1394_VC_INFO
{
    //
    // Channel or (unique-ID,offset). In the case of a recv
    // (local) FIFO vc, this will be set to the local node's unique
    // ID and address offset.
    //
    NIC1394_DESTINATION Destination;
} NIC1394_VC_INFO *PNIC1394_VC_INFO;
```

CONCLUSION

What has been described above is merely illustrative of the application of the principles of the present invention. Other arrangements and methods can be implemented by those skilled in the art without departing from the spirit and scope of the present invention. Any of the methods of the invention can be implemented in software that can be stored on computer disks or other computer-readable media for execution in a host or target computer. While an electrical medium has been described as the communications channel, the principles can also be applied using RF, fiber optic, or other media. No claim should be interpreted to be in means plus function format. Numbered steps in method claims should not be interpreted to require a particular ordering of the steps.

What is claimed is:

1. A method of communicating over a serial bus that connects a plurality of nodes, comprising the steps of:
    executing a programming interface call that specifies a desired type of virtual connection on the serial bus, wherein the desired type of virtual connection is selected from a group of plural different connection types;
    transmitting a request over the serial bus to obtain node-specific information associated with a node connected to the serial bus;
    receiving the node-specific information over the serial bus;
    associating the node-specific information with a connection handle;
    assigning a connection handle to communicate using the desired type of virtual connection specified; and
    transmitting data packets over the serial bus using the connection handle.

2. A method of communicating over a serial bus that connects a plurality of nodes, comprising the steps of:
    (1) executing a programming interface call that specifies a desired type of virtual connection on the serial bus, wherein the desired type of virtual connection is selected from a group of plural different connection types;
    (2) assigning a connection handle to communicate using the desired type of virtual connection specified in step (1); and
    (3) transmitting data packets over the serial bus using the connection handle,
        wherein the plural group of different connection types includes a connection defined by a unit identifier (UI) and FIFO address for a node on the serial bus.

3. The method of claim 2, wherein step (1) includes the step of selecting communication over a specified channel on the serial bus.

4. The method of claim 3, wherein step (1) includes the step of selecting communication over a broadcast channel on the serial bus.

5. The method of claim 2, wherein step (1) comprises the step of selecting communication by receiving data packets from a plurality of channels on the serial bus.

6. The method of claim 2, wherein step (3) comprises the step of transmitting streaming data over the serial bus between two of the plurality of nodes.

7. A method of communicating over a serial bus that connects a plurality of nodes, comprising the steps of:
    (1) executing a programming interface call that specifies a desired type of virtual connection on the serial bus, wherein the desired type of virtual connection is selected from a group of plural different connection types;
    (2) assigning a connection handle to communicate using the desired type of virtual connection specified in step (1); and
    (3) transmitting data packets over the serial bus using the connection handle, wherein step (1) includes the step of selecting communication by allocating bandwidth on an isochronous channel on the serial bus.

8. A method of cimmunicating over a serial bus that connects a plurality of nodes, comprising the steps of:
   (1) executing a programming interface call that specifies a desired type of virtual connection on the serial bus, wherein the desired type of virtual connection is selected from a group of plural different connection types;
   (2) assigning a connection handle to communicate using the desired type of virtual connection specified in step (1); and
   (3) transmitting data packets over the serial bus using the connection handle,
      wherein step (1) comprises the step of specifying a unit identifier (UI) and FIFO address associated with a specific node on the serial bus.

9. A method of communicating over a serial bus that connects a plurality of nodes, comprising the steps of:
   (1) executing a programming interface call that specifies a desired type of virtual connection on the serial bus, wherein the desired type of virtual connection is selected from a group of plural different connection types;
   (2) assigning a connection handle to communicate using the desired type of virtual connection specified in step (1);
   (3) transmitting data packets over the serial bus using the connection handle; and
   (4) repeating steps (1) and (2) within a single node, such that two separate virtual connections are created for communicating within a single node.

10. The method of claim 9, wherein the two separate virtual connections share a single physical channel on the serial bus.

11. A method of communicating over a serial bus using a connection-oriented protocol, comprising the steps of:
   (1) binding a client to a connection-oriented application programming interface that presents a generic interface as to the type of communication medium over which a connection is to be made;
   (2) specifying a parameter that selects a specific communication mechanism to be used in setting up the connection over the serial bus;
   (3) creating a virtual circuit over the serial bus using the specific communication mechanism;
   (4) transmitting packets over the serial bus using the virtual circuit; and
      mapping a function in the connection-oriented application programming interface into one or more serial bus-specific functions.

12. The method of claim 11, wherein step (2) comprises the step of selecting a specific channel on the serial bus.

13. The method of claim 11, wherein step (2) comprises the step of selecting an isochronous channel on the serial bus with an associated bandwidth.

14. The method of claim 11, further comprising the step of tearing down the virtual circuit that was created in step (3).

15. A method of communicating over a serial bus using a connection-oriented protocol, comprising the steps of:
   (1) binding a client to a connection-oriented application programming interface that presents a generic interface as to the type of communication medium over which a connection is to be made;
   (2) specifying a parameter that selects a specific communication mechanism to be used in setting up the connection over the serial bus;
   (3) creating a virtual circuit over the serial bus using the specific communication mechanism; and
   (4) transmitting packets over the serial bus using the virtual circuit,
      wherein step (3) comprises the step of creating an entry in a virtual circuit data structure that maps a virtual circuit to a channel on the serial bus.

16. The method of claim 15, wherein step (3) comprises the step of mapping two different virtual circuits to the same channel on the serial bus.

17. The method of claim 15, further comprising the step of detecting the addition of a first remote node to the serial bus and, in response thereto, notifying a client process of the addition.

18. A method of communicating over a serial bus using a connection-oriented protocol, comprising the steps of:
   (1) binding a client to a connection-oriented application programming interface that presents a generic interface as to the type of communication medium over which a connection is to be made;
   (2) specifying a parameter that selects a specific communication mechanism to be used in setting up the connection over the serial bus;
   (3) creating a virtual circuit over the serial bus using the specific communication mechanism;
   (4) transmitting packets over the serial bus using the virtual circuit;
   (5) creating a second virtual circuit to receive packets from the serial bus;
   (6) receiving packets from the serial bus and mapping the received packets to the second virtual circuit; and
   (7) routing the received and mapped packets to one or more clients that registered to receive the packets.

19. The method of claim 18, wherein step (7) comprises the step of replicating each mapped packet for each of a plurality of clients that registered to receive the packets.

20. A method of communicating over a serial bus using a connection-oriented protocol, comprising the steps of:
   (1) binding a client to a connection-oriented application programming interface that presents a generic interface as to the type of communication medium over which a connection is to be made;
   (2) specifying a parameter that selects a specific communication mechanism to be used in setting up the connection over the serial bus;
   (3) creating a virtual circuit over the serial bus using the specific communication mechanism; and
   (4) transmitting packets over the serial bus using the virtual circuit,
      wherein step (4) comprises the step of fragmenting the packets before they are transmitted over the serial bus.

21. A computer node including a processor, a memory, and a serial bus interface that provides serial communication facilities for communicating with other computer nodes over a serial bus,
   wherein the computer node includes at least one client application and protocol conversion software coupled between the client application and the serial bus interface, wherein the protocol conversion software presents a generic interface to the client application that hides implementation details of the serial bus, and wherein the protocol conversion software converts requests for connection-oriented network services by the client application into serial bus services compatible with the serial bus interface and creates a plurality of virtual circuits each corresponding to a channel on the serial bus.

22. A computer node including a processor, a memory, and a serial bus interface that provides serial communication facilities for communicating with other computer nodes over a serial bus, wherein the computer node includes at least one client application and protocol conversion software coupled between the client application and the serial bus interface, wherein the protocol conversion software presents a generic interface to the client application that hides implementation details of the serial bus, and wherein the protocol conversion software converts requests for connection-oriented network services by the client application into serial bus services compatible with the serial bus interface and creates a plurality of virtual circuits each corresponding to a unit identifier (UI) and FIFO address associated with one of the other computer nodes connected to the serial bus.

* * * * *

UNITED STATES PATENT AND TRADEMARK OFFICE
CERTIFICATE OF CORRECTION

PATENT NO. : 6,725,311 B1
DATED : April 20, 2004
INVENTOR(S) : Joseph Joy

It is certified that error appears in the above-identified patent and that said Letters Patent is hereby corrected as shown below:

Column 2,
Line 20, below "qos.htm, Jun. 1999." insert -- Unibrain S.A., "Unibrain FireAPI™ Documentation 1394 Class Driver, Kernel Mode Interface", July 1999, pp. 1-193. --.

Column 14,
Line 16, delete "reassember" and insert -- reassembler 512 --, therefore.
Line 17, delete "reassembly engine" and insert -- reassembler --, therefore.
Line 50, after "different" insert -- channel --, therefore.

Column 15,
Lines 21-22, delete "$_{NdisCoRequestinturncallstheNdis1394}$" and insert -- NdisCoRequest in turn calls the Ndis1394 --, therefore.

Signed and Sealed this

Ninth Day of August, 2005

JON W. DUDAS
*Director of the United States Patent and Trademark Office*